United States Patent
Lee

(10) Patent No.: US 10,264,301 B2
(45) Date of Patent: *Apr. 16, 2019

(54) METHODS AND APPARATUS TO DETECT SPILLOVER

(71) Applicant: The Nielsen Company (US), LLC, New York, NY (US)

(72) Inventor: Morris Lee, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,177

(22) Filed: Nov. 8, 2017

(65) Prior Publication Data

US 2018/0070117 A1     Mar. 8, 2018

Related U.S. Application Data

(63) Continuation of application No. 14/920,314, filed on Oct. 22, 2015, now Pat. No. 9,848,222.

(Continued)

(51) Int. Cl.
*H04N 21/25* (2011.01)
*H04N 21/466* (2011.01)
(Continued)

(52) U.S. Cl.
CPC .......... *H04N 21/252* (2013.01); *H04H 60/31* (2013.01); *H04H 60/52* (2013.01); *H04H 60/58* (2013.01);
(Continued)

(58) Field of Classification Search
None
See application file for complete search history.

(56) References Cited

U.S. PATENT DOCUMENTS

| 2,558,754 A | 7/1951 | Horn et al. |
| 3,056,135 A | 9/1962 | Currey et al. |

(Continued)

FOREIGN PATENT DOCUMENTS

| EP | 0161512 | 11/1985 |
| EP | 1021042 | 7/2000 |

(Continued)

OTHER PUBLICATIONS

European Patent Office, "Communication Pursuant to Rules 70(2) and 70a(2) EPC," issued in connection with European Patent Application No. 14757286.1, dated Jul. 26, 2016, 1 page.

(Continued)

*Primary Examiner* — Cai Y Chen
(74) *Attorney, Agent, or Firm* — Hanley, Flight & Zimmerman, LLC

(57) ABSTRACT

Methods and apparatus to improve the accuracy of crediting media exposure through detecting reverberation indicative of spillover are disclosed. An example apparatus includes a reverberation analyzer to identify a quantity of short durations of loudness in an audio signal of media presented by a media presentation device and calculate a ratio of the quantity of the short durations of loudness to a quantity of durations of loudness in the audio signal of the media, the quantity of the durations of loudness including the quantity of short durations of loudness. The example apparatus also includes a processor and memory in circuit with the processor, the memory including instructions that, when executed by the processor, cause the processor to mark the media as un-usable to credit a media exposure when the ratio does not satisfy a loudness ratio threshold.

20 Claims, 11 Drawing Sheets

Related U.S. Application Data

(60) Provisional application No. 62/192,889, filed on Jul. 15, 2015.

(51) Int. Cl.
*H04N 21/439* (2011.01)
*H04N 21/422* (2011.01)
*H04H 60/31* (2008.01)
*H04N 21/442* (2011.01)
*H04H 60/52* (2008.01)
*H04H 60/58* (2008.01)
*G10L 25/78* (2013.01)

(52) U.S. Cl.
CPC ... *H04N 21/42203* (2013.01); *H04N 21/4394* (2013.01); *H04N 21/44204* (2013.01); *H04N 21/4667* (2013.01); *G10L 25/78* (2013.01)

(56) References Cited

U.S. PATENT DOCUMENTS

| | | |
|---|---|---|
| 3,142,820 A | 7/1964 | Daniels |
| 3,351,910 A | 11/1967 | Miller et al. |
| 3,742,359 A | 6/1973 | Behymer |
| 4,107,734 A | 8/1978 | Percy et al. |
| 4,163,212 A | 7/1979 | Buerger et al. |
| 4,382,291 A | 5/1983 | Nakauchi |
| 4,626,904 A | 12/1986 | Lurie |
| 4,677,466 A | 1/1987 | Lert, Jr. et al. |
| 4,644,509 A | 2/1987 | Kiewit et al. |
| 4,652,915 A | 3/1987 | Heller, III |
| 4,695,879 A | 9/1987 | Weinblatt |
| 4,697,209 A | 9/1987 | Kiewit et al. |
| 4,718,106 A | 1/1988 | Weinblatt |
| 4,728,930 A | 3/1988 | Grote et al. |
| 4,769,697 A | 9/1988 | Gilley et al. |
| 4,779,198 A | 10/1988 | Lurie |
| 4,782,401 A | 11/1988 | Faerber et al. |
| 4,885,632 A | 12/1989 | Mabey et al. |
| 4,918,516 A | 4/1990 | Freeman |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,023,929 A | 6/1991 | Call |
| 5,040,217 A | 8/1991 | Brandenburg et al. |
| 5,081,680 A | 1/1992 | Bennett |
| 5,119,104 A | 6/1992 | Heller |
| 5,146,231 A | 9/1992 | Ghaem et al. |
| 5,151,788 A | 9/1992 | Blum |
| 5,226,090 A | 7/1993 | Kimura |
| 5,226,177 A | 7/1993 | Nickerson |
| 5,285,498 A | 2/1994 | Johnston |
| 5,333,091 A | 7/1994 | Iggulden et al. |
| 5,343,251 A | 8/1994 | Nafeh |
| 5,382,970 A | 1/1995 | Kieft |
| 5,387,993 A | 2/1995 | Heller et al. |
| 5,404,377 A | 4/1995 | Moses |
| 5,437,050 A | 7/1995 | Lamb et al. |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,564,088 A | 10/1996 | Saitoh |
| 5,574,962 A | 11/1996 | Fardeau et al. |
| 5,579,124 A | 11/1996 | Aijala et al. |
| 5,581,800 A | 12/1996 | Fardeau et al. |
| 5,583,776 A | 12/1996 | Levi et al. |
| 5,594,934 A | 1/1997 | Lu et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,696,866 A | 12/1997 | Iggulden et al. |
| 5,748,263 A | 5/1998 | Ball |
| 5,774,876 A | 6/1998 | Woolley et al. |
| 5,787,334 A | 7/1998 | Fardeau et al. |
| 5,793,409 A | 8/1998 | Tetsumura |
| 5,812,930 A | 9/1998 | Zavrel |
| 5,815,114 A | 9/1998 | Speasl et al. |
| 5,826,165 A | 10/1998 | Echeita et al. |
| 5,872,588 A | 2/1999 | Aras et al. |
| 5,884,278 A | 3/1999 | Powell |
| 5,893,093 A | 4/1999 | Wills |
| 5,896,554 A | 4/1999 | Itoh et al. |
| 5,980,246 A | 11/1999 | Ramsay et al. |
| 5,982,808 A | 11/1999 | Otto |
| 5,987,210 A | 11/1999 | Iggulden et al. |
| 5,999,689 A | 12/1999 | Iggulden |
| 6,002,443 A | 12/1999 | Iggulden |
| 6,002,918 A | 12/1999 | Heiman et al. |
| 6,035,177 A | 3/2000 | Moses et al. |
| 6,054,950 A | 4/2000 | Fontana |
| 6,078,672 A | 6/2000 | Saunders et al. |
| 6,091,956 A | 7/2000 | Hollenberg |
| 6,098,048 A | 8/2000 | Dashefsky et al. |
| 6,100,941 A | 8/2000 | Dimitrova et al. |
| 6,134,279 A | 10/2000 | Soichi et al. |
| 6,205,174 B1 | 3/2001 | Fert et al. |
| 6,208,385 B1 | 3/2001 | Konishi et al. |
| 6,243,739 B1 | 6/2001 | Schwartz et al. |
| 6,252,522 B1 | 6/2001 | Hampton et al. |
| 6,317,854 B1 | 11/2001 | Watanabe |
| 6,327,390 B1 | 12/2001 | Sun et al. |
| 6,359,557 B2 | 3/2002 | Bilder |
| 6,396,413 B2 | 5/2002 | Hines et al. |
| 6,404,977 B1 | 6/2002 | Iggulden |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,446,261 B1 | 9/2002 | Rosser |
| 6,449,392 B1 | 9/2002 | Divakaran et al. |
| 6,459,459 B1 | 10/2002 | Ratakonda |
| 6,467,089 B1 | 10/2002 | Aust et al. |
| 6,470,264 B2 | 10/2002 | Bide |
| 6,469,749 B1 | 11/2002 | Dimitrova et al. |
| 6,493,649 B1 | 12/2002 | Jones et al. |
| 6,497,658 B2 | 12/2002 | Roizen et al. |
| 6,563,423 B2 | 5/2003 | Smith |
| 6,563,430 B1 | 5/2003 | Kemink et al. |
| 6,577,238 B1 | 6/2003 | Whitesmith et al. |
| 6,597,405 B1 | 7/2003 | Iggulden |
| 6,614,987 B1 | 9/2003 | Ismail et al. |
| 6,621,867 B1 | 9/2003 | Sazzad et al. |
| 6,647,548 B1 | 11/2003 | Lu et al. |
| 6,654,800 B1 | 11/2003 | Rieger, III |
| 6,675,174 B1 | 1/2004 | Bolle et al. |
| 6,697,628 B1 | 2/2004 | Green et al. |
| 6,703,918 B1 | 3/2004 | Kita |
| 6,731,942 B1 | 5/2004 | Nageli |
| 6,748,317 B2 | 6/2004 | Maruyama et al. |
| 6,766,524 B1 | 7/2004 | Matheny et al. |
| 6,771,316 B1 | 8/2004 | Iggulden |
| 6,788,704 B1 | 9/2004 | Lindsay |
| 6,842,877 B2 | 1/2005 | Robarts et al. |
| 6,862,541 B2 | 3/2005 | Mizushima |
| 6,882,837 B2 | 4/2005 | Fernandez et al. |
| 6,888,457 B2 | 5/2005 | Wilkinson et al. |
| 6,890,285 B2 | 5/2005 | Rahman et al. |
| 6,898,434 B2 | 5/2005 | Pradhan et al. |
| 6,917,686 B2 | 7/2005 | Jot et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,043,746 B2 | 5/2006 | Ma |

(56) References Cited

U.S. PATENT DOCUMENTS

| | | |
|---|---|---|
| 7,046,162 B2 | 5/2006 | Dunstan |
| 7,047,548 B2 | 5/2006 | Bates et al. |
| 7,076,441 B2 | 7/2006 | Hind et al. |
| 7,080,061 B2 | 7/2006 | Kabala |
| 7,099,676 B2 | 8/2006 | Law et al. |
| 7,100,181 B2 | 8/2006 | Srinivasan et al. |
| 7,102,615 B2 | 9/2006 | Marks |
| 7,126,454 B2 | 10/2006 | Bulmer |
| 7,130,797 B2 | 10/2006 | Beaucoup et al. |
| 7,148,803 B2 | 12/2006 | Bandy et al. |
| 7,155,159 B1 | 12/2006 | Weinblatt et al. |
| 7,170,566 B2 | 1/2007 | McGee et al. |
| 7,171,331 B2 | 1/2007 | Vock et al. |
| 7,222,071 B2 | 5/2007 | Neuhauser et al. |
| 7,224,401 B2 | 5/2007 | Ackley et al. |
| 7,284,255 B1 | 10/2007 | Apel et al. |
| 7,295,108 B2 | 11/2007 | Corrado et al. |
| 7,295,114 B1 | 11/2007 | Drzaic et al. |
| 7,343,615 B2 | 3/2008 | Nelson et al. |
| 7,363,028 B2 | 4/2008 | de Clerq et al. |
| 7,373,820 B1 | 5/2008 | James |
| 7,428,310 B2 | 9/2008 | Park |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,555,766 B2 | 6/2009 | Kondo et al. |
| 7,587,728 B2 | 9/2009 | Wheeler et al. |
| 7,587,732 B2 | 9/2009 | Wright et al. |
| 7,627,139 B2 | 12/2009 | Marks et al. |
| 7,640,141 B2 | 12/2009 | Kolessar et al. |
| 7,668,188 B2 | 2/2010 | Chang et al. |
| 7,680,653 B2 | 3/2010 | Yeldener |
| 7,739,705 B2 | 6/2010 | Lee et al. |
| 7,760,248 B2 | 7/2010 | Marks et al. |
| 7,792,660 B2 | 9/2010 | Iyengar |
| 7,793,316 B2 | 9/2010 | Mears et al. |
| 7,796,516 B2 | 9/2010 | Todd et al. |
| 7,880,613 B1 | 2/2011 | Maeng |
| 7,882,514 B2 | 2/2011 | Nielsen et al. |
| 7,962,929 B1 | 6/2011 | Oddo et al. |
| 7,984,462 B2 | 7/2011 | Deng |
| 8,046,798 B1 | 10/2011 | Schlack et al. |
| 8,065,703 B2 | 11/2011 | Wilson et al. |
| 8,189,748 B2 | 5/2012 | Susama et al. |
| 8,239,887 B2 | 8/2012 | Gilboa et al. |
| 8,245,249 B2 | 8/2012 | Lee |
| 8,260,927 B2 | 9/2012 | Coronado et al. |
| 8,266,644 B2 | 9/2012 | Randolph et al. |
| 8,295,217 B2 | 10/2012 | Kone et al. |
| 8,345,620 B2 | 1/2013 | Chen et al. |
| 8,526,626 B2 | 9/2013 | Nielsen et al. |
| 8,549,552 B2 | 10/2013 | Ramaswamy et al. |
| 8,699,723 B2 | 4/2014 | Fried et al. |
| 8,738,763 B2 | 5/2014 | Crystal et al. |
| 8,855,101 B2 | 10/2014 | Chen |
| 8,885,842 B2 | 11/2014 | Chen |
| 8,925,024 B2 | 12/2014 | Wright et al. |
| 9,021,516 B2 | 4/2015 | Nielsen |
| 9,094,710 B2 | 7/2015 | Lee et al. |
| 9,118,960 B2 | 8/2015 | Nielsen |
| 9,191,704 B2 | 11/2015 | Nielsen |
| 9,197,930 B2 | 11/2015 | Lee |
| 9,219,969 B2 | 12/2015 | Nielsen |
| 9,258,607 B2 | 2/2016 | Chen |
| 2002/0010919 A1 | 1/2002 | Lu et al. |
| 2002/0166119 A1 | 1/2002 | Cristofalo |
| 2002/0057893 A1 | 5/2002 | Wood et al. |
| 2002/0059218 A1 | 5/2002 | August et al. |
| 2002/0059577 A1 | 5/2002 | Lu et al. |
| 2002/0068556 A1 | 6/2002 | Brown |
| 2002/0083440 A1 | 6/2002 | Dupuis et al. |
| 2002/0097885 A1* | 7/2002 | Birchfield ............ H04R 1/406 381/92 |
| 2002/0144259 A1 | 10/2002 | Gutta et al. |
| 2002/0150387 A1 | 10/2002 | Kun, II et al. |
| 2002/0154885 A1 | 10/2002 | Covell et al. |
| 2002/0174425 A1 | 11/2002 | Markel et al. |
| 2002/0186768 A1 | 12/2002 | Dimitrova et al. |
| 2002/0198762 A1 | 12/2002 | Donato |
| 2003/0033600 A1 | 2/2003 | Cliff et al. |
| 2003/0040272 A1 | 2/2003 | Lelievre et al. |
| 2003/0053538 A1 | 3/2003 | Katsavounidis et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0123841 A1 | 7/2003 | Jeannin |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0003073 A1 | 1/2004 | Krzyzanowski et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0039855 A1 | 2/2004 | Bohrer et al. |
| 2004/0072577 A1 | 4/2004 | Myllymaki et al. |
| 2004/0073615 A1 | 4/2004 | Darling |
| 2004/0073915 A1 | 4/2004 | Dureay |
| 2004/0095276 A1 | 5/2004 | Krumm et al. |
| 2004/0102247 A1 | 5/2004 | Smoot et al. |
| 2004/0122679 A1 | 6/2004 | Neuhauser et al. |
| 2004/0198386 A1 | 10/2004 | Dupray |
| 2004/0218701 A1 | 11/2004 | Singh et al. |
| 2004/0226035 A1 | 11/2004 | Hauser, Jr. |
| 2004/0266457 A1 | 12/2004 | Dupray |
| 2004/0268380 A1 | 12/2004 | Divakaran et al. |
| 2005/0006466 A1 | 1/2005 | Overhultz et al. |
| 2005/0013443 A1* | 1/2005 | Marumoto ............ H03G 9/005 381/56 |
| 2005/0035857 A1 | 2/2005 | Zhang et al. |
| 2005/0060740 A1 | 3/2005 | Stecyk |
| 2005/0108745 A1 | 5/2005 | Linzer |
| 2005/0129330 A1 | 6/2005 | Shyshkin |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0195334 A1 | 9/2005 | Yeh et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0223403 A1 | 10/2005 | Suito et al. |
| 2005/0234774 A1 | 10/2005 | Dupree |
| 2005/0243784 A1 | 11/2005 | Fitzgerald et al. |
| 2005/0244011 A1 | 11/2005 | Kim |
| 2005/0244012 A1 | 11/2005 | Asada |
| 2005/0264430 A1 | 12/2005 | Zhang et al. |
| 2006/0053110 A1 | 3/2006 | McDonald et al. |
| 2006/0056820 A1 | 3/2006 | Wu et al. |
| 2006/0075421 A1 | 4/2006 | Roberts et al. |
| 2006/0168613 A1 | 7/2006 | Wood et al. |
| 2006/0174265 A1 | 8/2006 | Hauser, Jr. |
| 2006/0204012 A1 | 9/2006 | Marks et al. |
| 2007/0005301 A1 | 1/2007 | Iyengar |
| 2007/0011040 A1 | 1/2007 | Wright et al. |
| 2007/0018708 A1 | 1/2007 | Yoo |
| 2007/0055987 A1 | 3/2007 | Lu et al. |
| 2007/0250901 A1 | 10/2007 | Mcintire et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |

(56) References Cited

U.S. PATENT DOCUMENTS

| | | |
|---|---|---|
| 2008/0059988 A1 | 3/2008 | Lee et al. |
| 2008/0091087 A1 | 4/2008 | Neuhauser et al. |
| 2008/0101454 A1 | 5/2008 | Luff et al. |
| 2008/0112574 A1 | 5/2008 | Brennan et al. |
| 2008/0127244 A1 | 5/2008 | Zhang |
| 2008/0130906 A1 | 6/2008 | Goldstein et al. |
| 2008/0204273 A1 | 8/2008 | Crystal et al. |
| 2008/0300700 A1 | 12/2008 | Hammer et al. |
| 2009/0037575 A1 | 2/2009 | Crystal et al. |
| 2009/0055170 A1 | 2/2009 | Nagahama |
| 2009/0133058 A1 | 5/2009 | Kouritzin et al. |
| 2009/0141908 A1 | 6/2009 | Jeong et al. |
| 2009/0157826 A1 | 6/2009 | Stettner |
| 2009/0169024 A1 | 7/2009 | Krug et al. |
| 2009/0265729 A1 | 10/2009 | Weinblatt |
| 2009/0285409 A1 | 11/2009 | Yoshizawa et al. |
| 2009/0285551 A1 | 11/2009 | Berry |
| 2009/0290064 A1 | 11/2009 | Matsumoto et al. |
| 2009/0296526 A1 | 12/2009 | Amada |
| 2009/0316918 A1 | 12/2009 | Niemisto et al. |
| 2010/0053442 A1 | 3/2010 | Kudo |
| 2010/0169908 A1 | 7/2010 | Nielsen |
| 2010/0199296 A1 | 8/2010 | Lee et al. |
| 2010/0268573 A1 | 10/2010 | Jain et al. |
| 2010/0303254 A1 | 12/2010 | Yoshizawa et al. |
| 2011/0019835 A1 | 1/2011 | Schmidt et al. |
| 2011/0061088 A1 | 3/2011 | Rieger et al. |
| 2011/0091055 A1 | 4/2011 | LeBlanc |
| 2011/0110531 A1 | 5/2011 | Klefenz et al. |
| 2011/0157475 A1 | 6/2011 | Wright et al. |
| 2011/0222373 A1 | 9/2011 | Lee |
| 2011/0222528 A1 | 9/2011 | Chen |
| 2011/0239253 A1 | 9/2011 | West et al. |
| 2011/0292291 A1 | 12/2011 | Deng |
| 2011/0311064 A1 | 12/2011 | Teutsch |
| 2012/0020486 A1 | 1/2012 | Fried et al. |
| 2012/0120218 A1 | 5/2012 | Flaks et al. |
| 2012/0124602 A1 | 5/2012 | Tan et al. |
| 2012/0148058 A1 | 6/2012 | Chen |
| 2012/0148067 A1 | 6/2012 | Petersen et al. |
| 2012/0169359 A1 | 7/2012 | Kim et al. |
| 2012/0219156 A1 | 8/2012 | Ramaswamy et al. |
| 2012/0232912 A1 | 9/2012 | Tammi |
| 2013/0034138 A1 | 2/2013 | Lee et al. |
| 2013/0034244 A1 | 2/2013 | Van Raalte et al. |
| 2013/0121499 A1 | 5/2013 | Li et al. |
| 2013/0160042 A1 | 6/2013 | Stokes et al. |
| 2013/0166050 A1 | 6/2013 | Duwenhorst |
| 2013/0238276 A1 | 9/2013 | Vock et al. |
| 2014/0007153 A1 | 1/2014 | Nielsen et al. |
| 2014/0126746 A1 | 5/2014 | Shin et al. |
| 2014/0150001 A1 | 5/2014 | McMillan |
| 2014/0250448 A1 | 9/2014 | Nielsen |
| 2014/0259039 A1 | 9/2014 | Nielsen |
| 2014/0270195 A1 | 9/2014 | Nielsen |
| 2014/0282640 A1 | 9/2014 | Nielsen |
| 2014/0282663 A1 | 9/2014 | Lee |
| 2014/0282664 A1 | 9/2014 | Lee |
| 2014/0380349 A1 | 12/2014 | Shankar et al. |
| 2015/0052541 A1 | 2/2015 | Chen |
| 2015/0082332 A1 | 3/2015 | Wright et al. |
| 2015/0195592 A1 | 7/2015 | Nielsen |
| 2015/0319491 A1 | 11/2015 | Nielsen |
| 2015/0319492 A1 | 11/2015 | Lee et al. |
| 2016/0080805 A1 | 3/2016 | Lee |
| 2017/0019695 A1 | 1/2017 | Lee |

FOREIGN PATENT DOCUMENTS

| | | |
|---|---|---|
| EP | 1133090 | 9/2001 |
| EP | 1213860 | 6/2002 |
| EP | 2341704 | 8/2011 |
| GB | 2260246 | 4/1993 |
| GB | 2292506 | 2/1996 |
| JP | 2000224617 | 8/2000 |
| JP | 2000307530 | 11/2000 |
| JP | 2003061027 | 2/2003 |
| JP | 2003125102 | 4/2003 |
| JP | 2003279400 | 10/2003 |
| JP | 2005322262 | 11/2005 |
| JP | 2006194700 | 7/2006 |
| JP | 2006215774 | 8/2006 |
| JP | 4219749 B2 | 2/2009 |
| JP | 2010257278 | 11/2010 |
| JP | 2012507904 | 3/2012 |
| JP | 2012095014 | 5/2012 |
| JP | 2012242214 | 12/2012 |
| KR | 20020000288 | 1/2002 |
| KR | 100911679 | 8/2009 |
| KR | 1020040004648 | 8/2009 |
| KR | 1020100048330 | 12/2011 |
| KR | 1020120067477 | 6/2012 |
| KR | 20120131826 | 12/2012 |
| WO | 8810540 | 12/1988 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 0161892 | 8/2001 |
| WO | 02093929 | 11/2002 |
| WO | 02097791 | 12/2002 |
| WO | 03077455 A1 | 9/2003 |
| WO | 2003077455 | 9/2003 |
| WO | 03087871 | 10/2003 |
| WO | 2004051303 | 6/2004 |
| WO | 2004051304 | 6/2004 |
| WO | 2005104676 | 11/2005 |
| WO | 2005124583 | 12/2005 |
| WO | 2005125198 | 12/2005 |
| WO | 2006020560 | 2/2006 |
| WO | 2006037014 | 4/2006 |
| WO | 2006096177 | 9/2006 |
| WO | 2006121681 | 11/2006 |
| WO | 2010049809 | 5/2010 |

OTHER PUBLICATIONS

IP Australia, "Examination Report No. 2," issued in connection with Australian Patent Application No. 2013204937, dated May 24, 2016, 2 pages.

European Patent Office, "Extended Search Report," issued in connection with Application No. 14763913.2, dated Jun. 17, 2016 12 pages.

Reid et al., "Active Stereo Sound Localization," The Journal of the Acoustical Society of America, American Institute of Physics for the Acoustical Society of America, vol. 113, No. 1, Jan. 2003, 9 pages.

Liu et al., "Acoustic Positioning Using Multiple Microphone Arrays," Technical Report CS-2004-01, Jan. 23, 2004, retrieved from <http://www.cs.dal.ca/sites/default.files.technicalreports/CS-2004-01.pdf>, retrieved on Aug. 3, 2012, 76 pages.

European Patent Office, "Communication Pursuant to Rules 70(2) and 70a(2) EPC," issued in connection with Eueopean Patent Application No. 05798935.2, dated May 22, 2012, 1 page.

European Patent Office, "Extended European Search Report," issued in connection with European Patent Application No. 14757286.1, dated Jul. 8, 2016, 7 pages.

Mijic et al., "Statistical Properties of Music Signals," Audio Engineering Society, Convention Paper 7702, May 7-10, 2009, 10 pages.

IP Australia, "Notice of Acceptance," issued in connection with Australian Patent Application No. 2013204937, dated Jun. 30, 2016, 2 pages.

European Patent Office, "Communication Pursuant to Rules 70(2) and 70a(2) EPC," issued in connection with European Patent Application No. 14763913.2, dated Jul. 5, 2016, 1 page.

European Patent Office, "Communication Pursuant to Article 94(3) EPC," issued in connection with European Patent Application No. 05798935.2, May 17, 2016, 8 pages.

"American Technology Corporation—Retailer Ads—AM & FM Sounds", [online]., May 4, 2004 [retrieved on Sep. 29, 2004]. Retrieved from the Internet: <URL: www.woodynorris.com>. (3 pages).

(56) References Cited

OTHER PUBLICATIONS

"Arbitron & Scarborough Unveil New Mall Shopper Audience Measurement", [online]. Streamline Media Inc., Jun. 22, 2007 [retrieved in 2007]. Retrieved from the Internet: <URL: www.radioink.com>. (2 pages).

"Arkon Sound Feeder II FM Transmitter", [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Cricket v2 User Manual," Cricket Project, MIT Computer Science and Artificial Intelligence Lab, Cambridge, U.S.A., Jan. 2005 (57 pages).

"Discovery Spy Motion Tracking System", [online]. Discovery Communications Inc., 2004 [retrieved on Sep. 14, 2004]. Retrieved from the Internet: <URL: http://shopping.discovery.com/stores/servlel/Produc!Display?catalogld=1OOOO&storeld=1OOOO&lanlan=-1 &productld=53867&partnumber=689638>. (3 pages).

"Dust Networks—SmartMesh", [online]. Dust Networks Inc., 2002 [retrieved on Sep. 29, 2004]. Retrieved from the Internet: <URL: www.dustnetworks.com>. (2 pages).

"Eltek GenII Radio Data Logging System", [online]. Eltek Lid., 2004 [retrieved on Sep. 29, 2004]. Retrieved from the Internet: <URL: www.elteckdataloggers.co.uk>. (4 pages).

Radio Shack, "FM Wireless Microphone Module Kits", [online]. Horizon Industries, 2004 [retrieved on Sep. 30, 2004]. Retrieved from the Internet: <URL: www.horizonindustries.com/fm.htm>. (1 page).

"New Sonitor Patent Combines Ultrasound and RFID", [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System", [online]. Wireless Communication Technologies Group, National Institute of Standards and Technology, Mar. 12, 2004 [retrieved in Nov. 1, 2004]. Retrieved from the Internet: <URL: www.antd.nisl.gov>. (2 pages).

"The Nibble Location System", [online]. UCLA, May 21, 2001 [retrieved on Nov. 2, 2004]. Retrieved from the Internet: <URL: http://mmsl.cs.ucla.edu/nibble/>. (13 pages).

"UHF Radio Data Logging System—GenII Data Logger", [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).

"University Library Navigation Enabled by Ekahau", [online]. Directions Magazine, Jun. 12, 2003 [Aug. 3, 2007]. Retrieved from the Internet: <URL: http://www/directionsmag.com/press.releases/index.php? duty=Show&id=7276&trv=1>. (3 pages).

"Worlds Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

"X1 Button Radio—The World's Smallest Radio", [online]. Exxun, 2004 [retrieved on Sep. 29, 2004]. Retrieved from the Internet: <URL: www.exxun.com>. (2 pages).

Azondekon et al., "Service Selection in Networks Based on Proximity Confirmation Using Infrared", hftp://www.scs.carleton.ca/-barbeau/Publications/2002/azondekon.pdf, International Conference on Telecommunications (ICT) Beijing, 2002 (5 pages).

Bahl et al., "A Software System for Locating Mobile Users: Design, Evaluation, and Lessons," Technical Report MSR-TR-2000-12 Microsoft Research, [retrieved from internet, http://research.microsofl.com/-bahl/Papers/Pdf/radar.pdf] Feb. 2000 (13 pages).

Battelle, Report: "Lexington Area Travel Data Collection Test; GPS for Personal Travel Surveys", Final Report for Office of Highway Information Management, Office of Technology Application and Federal Highway Administration, Sep. 1997 (92 pages).

Battiti et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Bernstein et al., "An Introduction to Map Matching for Personal Navigation Assistants," New Jersey TIDE Center, New Jersey Institute ofTechnology, Aug. 1996 (17 pages).

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Ferguson, Michael, "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

Gentile et al., "Robust Location using System Dynamics and Motion Constraints," National Institute of Standards and Technology, Wireless Communication Technologies Group, Jun. 24, 2004 (5 pages).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).

Holm, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

Kanellos, "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

Kerschbaumer, "Who's Really Watching?" PricewaterhouseCoopers Global Entertainment and Medai Outlook 2004-2008, May 16, 2005 (4 pages).

McCarthy et al., "RF Free Ultrasonic Positioning (Presentation)," 7th International Symposiom on Wearable Computers, Oct. 2003 (12 pages).

McCarthy et al., "RF Free Ultrasonic Positioning," Department of Computer Science, University of Bristol, U.K., 2003 (7 pages).

Schuman, "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).

Yeung et al., "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

U.S. Patent and Trademark Office, "Notice of Allowance," issued in connection with U.S. Appl. No. 14/800,304, dated Jun. 29, 2017, 14 pages.

European Patent Office, "Communication Pursuant to Article 94(3) EPC," issued in connection with European Patent Application No. 14757286.1, dated Apr. 3, 2017, 6 pages.

U.S. Patent and Trademark Office, "Final Office Action," issued in connection with U.S. Appl. No. 14/800,304, dated Mar. 24, 2017, 11 pages.

Mihajlovic et al., "Analysis of Parameters of the Speech Signal Loudness of Professional Television Announcers," Audio Engineering Society Convention Paper 8410, Presented at the 130th Convention, May 13-16, 2011, 15 pages.

State Intellectual Property Office of China, "Notice of Decision of Granting Patent Right for Invention," issued in connection with Chinese Patent Application No. 201480001408.9, dated Mar. 9, 2017, 2 pages.

Chinese Patent Office, "First Office Action," issued in connection with Chinese Patent Application No. 201480001408.9, dated Aug. 22, 2016, 8 pages.

U.S. Patent and Trademark Office, "Non-Final Office Action," issued in connection with U.S. Appl. No. 14/800,304, dated Aug. 23, 2016, 9 pages.

United States Patent and Trademark Office, "Non-Final Office Action," issued in connection with U.S. Appl. No. 12/757,755, dated Sep. 20, 2010 (10 pages).

United States Patent and Trademark Office, "Final Office Action," issued in U.S. Appl. No. 11/692,087, dated Oct. 30, 2009 (14 pages).

United States Patent and Trademark Office, "Notice of Allowance," issued in U.S. Appl. No. 11/692,087, dated Jan. 12, 2010 (8 pages).

(56) References Cited

OTHER PUBLICATIONS

United States Patent and Trademark Office, "Notice of Allowance," issued in U.S. Appl. No. 12/757,755, dated Mar. 23, 2015 (9 pages).
United States Patent and Trademark Office, "Decision on Appeal," issued in U.S. Appl. No. 12/757,755, dated Dec. 17, 2014 (3 pages).
Japan Patent Office, "Notice of Reasons for Rejection," issued in connection with Japanese Patent Application No. 2011-121053, dated Feb. 14, 2013 (4 pages).
United States Patent and Trademark Office, "Non-Final Office Action," issued in connection with U.S. Appl. No. 14/313,414, dated Mar. 13, 2015 (5 pages).
United States Patent and Trademark Office. "Notice of Allowance," issued in connection with U.S. Appl. No. 13/791,432, dated Apr. 10, 2015 (9 pages).
United States Patent and Trademark Office, "Notice of Allowance," issued in connection with U.S. Appl. No. 14/313,414, dated Jul. 17, 2015 (8 pages).
United States Patent and Trademark Office, "Notice of Allowance," issued in connection with U.S. Appl. No. 13/791,432, dated Jul. 9, 2014 (8 pages).
United States Patent and Trademark Office, "Non-Final Office Action," issued in connection with U.S. Appl. No. 13/791,432 dated Mar. 18, 2014 (7 pages).
International Searching Authority, "International Search Report," issued in connection with International Patent Application No. PCT/US2014/020337, dated Jun. 27, 2014 (4 pages).
United States Patent and Trademark Office, "Non-Final Office Action," issued in connection with U.S. Appl. No. 14/500,443, dated May 28, 2015 (14 pages).
United States Patent and Trademark Office, "Notice of Allowance," issued in connection with U.S. Appl. No. 14/500,443, dated Sep. 30, 2015 (8 pages).
Canadian Intellectual Property Office, "Notice of Allowance," issued in connection with Canadian Patent Application No. 2,581,982, dated Jan. 14, 2013 (1 page).
European Patent Office, "Extended European Search Report," issued in connection with European Patent Application No. 05798935.2, dated May 3, 2012 (7 pages).
Mexico Patent Office, "Office Action," issued in connection with Mexican Patent Application No. MX/a/2007/003680, dated Sep. 14, 2009 (5 pages).
United States Patent and Trademark Office, "Non-Final Office Action," issued in connection with U.S. Appl. No. 11/692,087, dated May 13, 2009 (10 pages).
United States Patent and Trademark Office, "Final Office Action," issued in connection with U.S. Appl. No. 12/967,415, dated Apr. 18, 2013 (8 pages).
United States Patent and Trademark Office, "Final Office Action," issued in connection with U.S. Appl. No. 12/967,415, dated Dec. 19, 2013 (9 pages).
United States Patent and Trademark Office, "Non-Final Office Action," issued in connection with U.S. Appl. No. 12/967,415, dated Jan. 3, 2013 (10 pages).
United States Patent and Trademark Office, "Non-Final Office Action," issued in connection with U.S. Appl. No. 12/967,415, dated Sep. 6, 2013 (8 pages).
United States Patent and Trademark Office, "Notice of Allowance," issued in connection with U.S. Appl. No. 12/967,415, dated Jun. 30, 2014 (7 pages).
United States Patent and Trademark Office, "Notice of Allowability," issued in connection with U.S. Appl. No. 12/967,415, dated Sep. 11, 2014 (4 pages).
IP Australia, "Patent Examination Report No. 2," issued in connection with Australian Patent Application No. 2013204919, dated Aug. 30, 2015 (2 pages).
Canadian Intellectual Property Office, "Examination Report," issued in connection with Canadian Patent Application No. 2,875,592, dated Mar. 30, 2015 (5 pages).

International Searching Authority, "International Search Report," issued in connection with International Patent Application No. PCT/US2014/022704, dated Jun. 25, 2014 (3 pages).
International Searching Authority, "Written Opinion" issued in connection with International Patent Application No. PCT/US2014/022704, dated Jun. 25, 2014 (5 pages).
International Searching Authority, "International Search Report," issued in connection with International Patent Application No. PCT/US05/34743, dated Oct. 31, 2006 (4 pages).
International Searching Authority, "Written Opinion" issued in connection with International Patent Application No. PCT/US05/34743, dated Oct. 31, 2006 (7 pages).
United States Patent and Trademark Office, "Final Office Action," issued in connection with U.S. Appl. No. 13/828,702, dated Jan. 5, 2015 (12 pages).
United States Patent and Trademark Office, "Non-Final Office Action," issued in connection with U.S. Appl. No. 13/828,702, dated Jul. 23, 2014 (10 pages).
United States Patent and Trademark Office, "Notice of Allowance," issued in connection with U.S. Appl. No. 13/828,702, dated Jun. 11, 2015 (9 pages).
IP Australia, "Patent Examination Report No. 1," issued in connection with Australian Patent Application No. 2013204919, dated Aug. 27, 2014 (4 pages).
Canadian Intellectual Property Office, "Notice of Allowance," issued in connection with Canadian Patent Application No. 2,875,592, dated Dec. 14, 2015 (1 page).
International Bureau, "International Preliminary Report on Patentability," issued in connection with International Patent Application No. PCT/US2014/022704, dated Sep. 15, 2015 (6 pages).
Canadian Intellectual Property Office, "Office Action," issued in connection with Canadian Patent Application No. 2,873,115, dated Dec. 18, 2014 (4 pages).
International Searching Authority, "Search Report," issued in connection with International Patent Application No. PCT/US2014/018921, dated Jun. 27, 2014 (5 pages).
International Searching Authority, "Written Opinion," issued in connection with International Patent Application No. PCT/US2014/018921, dated Jun. 27, 2014 (6 pages).
IP Australia, "Patent Examination Report No. 1 ," issued in connection with Australian Patent Application No. 2013204263, dated Oct. 28, 2014 (3 pages).
IP Australia, "Notice of Acceptance," issued in connection with Australian Patent Application No. 2013204263, dated Mar. 17, 2015 (3 pages).
United States Patent and Trademark Office, "Non-Final Office Action," issued in connection with U.S. Appl. No. 13/782,895, dated Sep. 18, 2013 (22 pages).
United States Patent and Trademark Office, "Notice of Allowance," issued in connection with U.S. Appl. No. 13/782,895, dated Dec. 19, 2014 (5 pages).
United States Patent and Trademark Office, "Non-Final Office Action," issued in connection with U.S. Appl. No. 13/782,895, dated May 22, 2014 (18 pages).
United States Patent and Trademark Office, "Non-Final Office Action," issued in connection with U.S. Appl. No. 14/662,792, dated Jun. 30, 2015 (8 pages).
United States Patent and Trademark Office, "Notice of Allowance," issued in connection with U.S. Appl. No. 14/662,792, dated Dec. 10, 2015 (9 pages).
Canadian Intellectual Property Office, "Office Action," issued in connection with Canadian Patent Application No. 2,873,115, dated Jun. 8, 2015 (3 pages).
International Bureau, "International Preliminary Report on Patentability," issued in connection with International Patent Application No. PCT/US2014/018921, dated Sep. 1, 2015 (7 pages).
IP Australia, "Patent Examination Report No. 1," issued in connection with Australian Patent Application No. 2015200081, dated Aug. 20, 2015 (2 pages).
United States Patent and Trademark Office, "Non-Final Office Action," issued in connection with U.S. Appl. No. 14/796,584, dated Oct. 26, 2015 (6 pages).

(56) References Cited

OTHER PUBLICATIONS

United States Patent and Trademark Office, "Notice of Allowance," issued in connection with U.S. Appl. No. 14/796,584, dated Dec. 22, 2015 (7 pages).
IP Australia, "Patent Examination Report No. 1," issued in connection with Australian Patent Application No. 2013204911, dated Oct. 20, 2014 (4 pages).
IP Australia, "Notice of Acceptance," issued in connection with Australian Patent Application No. 2013204911, dated Jan. 15, 2015 (2 pages).
International Searching Authority, "Written Opnion," issued in connection with International Patent Application No. PCT/US2014/020337, dated Jun. 27, 2014 (4 pages).
International Bureau, "International Preliminary Report on Patentability," issued in connection with International Patent Application No. PCT/US2014/020337, dated Sep. 8, 2015 (5 pages).
International Bureau, "International Preliminary Report on Patentability,"issued in connection with International Patent Application No. PCT/US2014/028131,dated Sep. 15, 2015 (7 pages).
IP Australia, "Patent Examination Report No. 1", issued in connection with Australian Patent Application No. 2013204937, dated Feb. 24, 2015 (5 pages).
International Searching Authority, "International Search Report and Written Opinion", issued in connection with International Application No. PCT/US2014/028131, dated Jul. 11, 2014 (14 pages).
United States Patent and Trademark Office, "Ex parte Quayle Action," issued in connection with U.S. Appl. No. 13/837,441, mailed May 5, 2015 (7 pages).
United States Patent and Trademark Office, "Notice of Allowance," issued in connection with U.S. Appl. No. 13/837,441, dated Jul. 23, 2015 (5 pages).
United States Patent and Trademark Office, "Corrected Notice of Allowability," issued in connection with U.S. Appl. No. 13/837,441, dated Oct. 29, 2015 (2 pages).
International Searching Authority, "Written Opinion," issued in connection with International PatentApplication No. PCT/US2014/021986, dated Jun. 27, 2014 (4 pages).
International Searching Authority, "International Search Report," issued in connection with International Patent Application No. PCT/US2014/021986, dated Jun. 27, 2014 (3 pages).
Ip Australia, "Patent Examination Report No. 1 ," issued in connection with Australian Patent Application No. 2013205025, dated Aug. 11, 2014 (5 pages).
United States Patent and Trademark Office, "Non-Final Office Action," issued in connection with U.S. Appl. No. 13/801,176, dated Apr. 9, 2015 (7 pages).
United States Patent and Trademark Office, "Notice of Allowance," issued in connection with U.S. Appl. No. 13/801,176, dated Aug. 12, 2015 (7 pages).
International Bureau, "International Preliminary Report on Patentability," issued in connection with International Patent Application No. PCT/US2014/021986, dated Sep. 15, 2015 (6 pages).
International Bureau, "International Preliminary Report on Patentability", issued in connection with International Patent Application No. PCT/US2005/34743, dated Mar. 27, 2007 (8 pages).
United States Patent and Trademark Office, "Corrected Notice of Allowability," issued in connection with U.S. Appl. No. 14/313,414, dated Nov. 16, 2015 (4 pages).
Finding Your Way Around the TI-83+/84+ Graphing Calculator: Statistics 2, "Correlation Coefficient," retrieved from http://mathbits.com/mathbits/tisection/statistics2/correlation.htm, retrieved on Nov. 30, 2010 (3 pages).
Unpublished U.S. Appl. No. 09/076,517, filed May 12, 1998 (77 pages).
IP Australia, "Notice of Acceptance," issued in connection with Australian Patent Application No. 2015200081, dated Jan. 12, 2016 (2 pages).
IP Australia, "Notice of Acceptance," issued in connection with Australian Patent Application No. 2013204919, dated Jan. 11, 2016, (2 pages).
Canadian Intellectual Property Office, "Office Action," issued in connection with Canadian Patent Application No. 2,875,356, dated Jan. 25, 2016 (5 pages).
Canadian Intellectual Property Office, "Office Action," issued in connection with Canadian Patent Application No. 2,875,374, dated Jan. 18, 2016 (5 pages).
United States Patent and Trademark Office, "Notice of Allowance," issued in connection with U.S. Appl. No. 14/879,544, dated Mar. 3, 2016 (9 pages).
Canadian Intellectual Property Office, "Office Action," issued in connection with Canadian Patent Application No. 2,722,750, dated Jan. 3, 2014, 2 pages.
Canadian Intellectual Property Office, "Office Action," issued in connection with Canadian Patent Application No. 2,722,750, dated Nov. 22, 2012, 2 pages.
Canadian Intellectual Property Office, "Office Action," issued in connection with Canadian Patent Application No. 2,722,750, dated Feb. 20, 2015, 3 page.
Canadian Intellectual Property Office, "Notice of Allowance," issued in connection with Canadian Patent Application No. 2,901,078, dated Oct. 31, 2016, 1 page.
Duan et al., "Segmentation, Categorization and Identification of Commercials from TV Streams Using Multimodal Analysis," Proceedings of the 14th Annual ACM International Conference on Multimedia, Oct. 2006, 10 pages.
European Patent Office, "Communication Pursuant to Article 94(3) EPC," issued in connection with European Patent Application No. 10015577.9, dated Sep. 10, 2014, 4 pages.
European Patent Office, "Extended European Search Report," issued in connection with European Patent Application No. 10015577.9, dated Jul. 7, 2011, 6 pages.
European Patent Office, "Communication under Rule 71(3) EPC," issued in connection with European Patent Application No. 10015577.9, dated Oct. 12, 2016, 75 pages.
European Patent Office, "Summons to Attend Oral Proceedings Pursuant to Rule 115(1) EPC," issued in connection with European Patent Application No. 10015577.9, dated Mar. 24, 2016, 3 pages.
IP Australia, "Patent Examination Report No. 3," issued in connection with Australian Patent Application No. 2010241401, dated Jun. 10, 2014, 3 pages.
IP Australia, "Patent Examination Report No. 2," issued in connection with Australian Patent Application No. 2010241401, dated Apr. 9, 2014, 3 pages.
IP Australia, "Patent Examination Report No. 1," issued in connection with Australian Patent Application No. 2010241401, dated Sep. 12, 2012, 6 pages.
IP Australia, "Patent Examination Report No. 2," issued in connection with Australian Patent Application No. 2013203872, dated Apr. 7, 2015, 3 pages.
IP Australia, "Notice of Acceptance," issued in connection with Australian Patent Application No. 2013203872, dated Feb. 19, 2016, 2 pages.
IP Australia, "Patent Examination Report No. 2," issued in connection with Australian Patent Application No. 2013203753, dated Apr. 9, 2015, 3 pages.
IP Australia, "Patent Examination Report No. 1," issued in connection with Australian Patent Application No. 2013203753, dated Jun. 6, 2014, 3 pages.
U.S. Patent and Trademark Office, "Notice of Allowance," issued in connection with U.S. Appl. No. 12/827,701, dated Oct. 27, 2014, 7 pages.
U.S. Patent and Trademark Office, "Non-Final Office Action," issued in connection with U.S. Appl. No. 12/827,701, dated Dec. 31, 2013, 21 pages.
U.S. Patent and Trademark Office, "Non-Final Office Action," issued in connection with U.S. Appl. No. 12/827,701, dated Apr. 11, 2012, 16 pages.
U.S. Patent and Trademark Office, "Final Office Action," issued in connection with U.S. Appl. No. 12/827,701, dated Aug. 12, 2014, 16 pages.
U.S. Patent and Trademark Office, "Final Office Action," issued in connection with U.S. Appl. No. 12/827,701, dated Dec. 18, 2012, 18 pages.

(56) References Cited

OTHER PUBLICATIONS

U.S. Patent and Trademark Office, "Non-Final Office Action," issued in connection with U.S. Appl. No. 14/554,268, dated Jun. 27, 2016, 11 pages.

U.S. Patent and Trademark Office, "Notice of Allowance," issued in connection with U.S. Appl. No. 14/554,268, dated Oct. 24, 2016, 8 pages.

European Patent Office, "Communication Pursuant to Rules 70(2) and 70a(2) EPC," issued in connection with European Patent Application No. 14760693.3, dated Oct. 5, 2016, 1 page.

European Patent Office, "Extended European Search Report," issued in connection with European Patent Application No. 14760693.3, dated Sep. 15, 2016, 8 pages.

U.S. Patent and Trademark Office, "Final Office Action," issued in connection with U.S. Appl. No. 14/920,314, dated Jan. 4, 2017, 47 pages.

U.S. Patent and Trademark Office, "Non-final Office Action," issued in connection with U.S. Appl. No. 14/920,314, dated Aug. 8, 2016, 47 pages.

U.S. Patent and Trademark Office, "Notice of Allowance," issued in connection with U.S. Appl. No. 14/920,314, dated Jul. 27, 2017, 23 pages.

\* cited by examiner

METHODS AND APPARATUS TO DETECT SPILLOVER

RELATED APPLICATIONS

This patent arises from a continuation of U.S. patent application Ser. No. 14/920,314, filed Oct. 22, 2015, now U.S. Pat. No. 9,848,222, which claims the benefit of U.S. Provisional Patent Application Ser. No. 62/192,889, filed Jul. 15, 2015. U.S. patent application Ser. No. 14/920,314 and U.S. Provisional Patent Application Ser. No. 62/192,889 are hereby incorporated by reference in their entirety. Priority to U.S. patent application Ser. No. 14/920,314 and U.S. Provisional Patent Application Ser. No. 62/192,889 is claimed.

FIELD OF THE DISCLOSURE

This disclosure relates generally to media monitoring, and, more particularly, to methods and apparatus to detect spillover.

BACKGROUND

Audience measurement of media, such as television, music, movies, radio, Internet websites, streaming media, etc., is sometimes carried out by monitoring media exposure of panelists who are statistically selected to represent particular demographic groups. Using various statistical methods, the captured media exposure data is processed to determine the size and demographic composition of the audience(s) for programs of interest. The audience size and demographic information is valuable to advertisers, broadcasters and/or other entities. For example, audience size and demographic information is a factor in the placement of advertisements, as well as a factor in valuing commercial time slots during a particular program.

DETAILED DESCRIPTION

Figure 1:
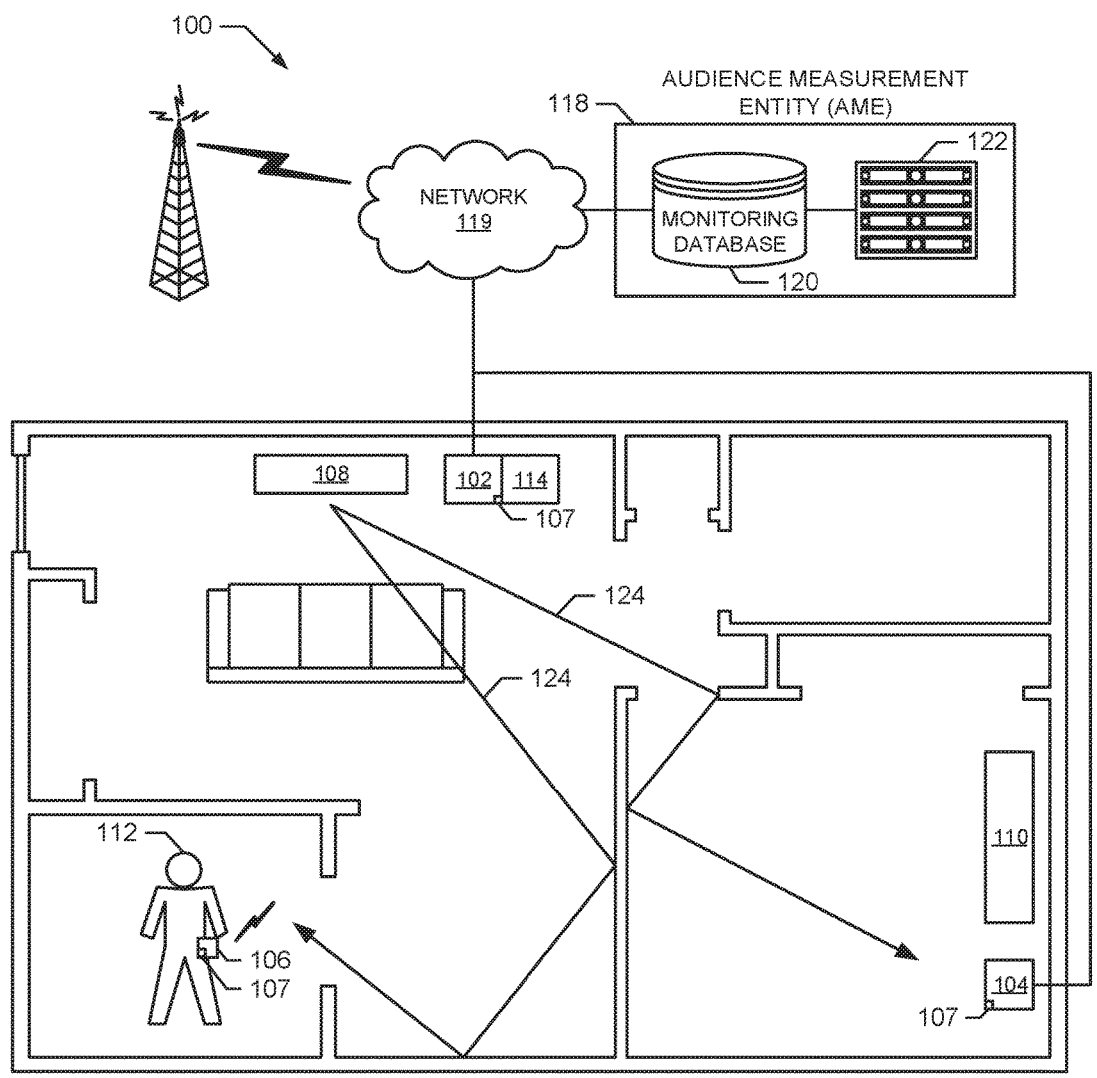
FIG. 1 depicts an example system including meters with spillover managers to detect spillover to reduce media monitoring inaccuracies.

Examples disclosed herein may be used to improve the accuracy of crediting media exposure through detecting reverberation indicative of spillover. An audience measurement entity (AME) enlists persons to participate in measurement panels. Such persons (e.g., panelists) agree to allow the AME to measure their exposure to media (e.g., television programming, radio programming, Internet, advertising, signage, outdoor advertising, etc.). To associate media exposure data (i.e., data indicative of media presentation) with panelist demographics, the AME monitors media device(s) and/or panelist(s) using media monitoring meters. In some examples, meters (e.g., stationary meters) are placed with and/or near media presentation devices (e.g., televisions, stereos, speakers, computers, etc.) within a home or household. For example, a meter may be placed in a room with a television and another meter may be placed in a different room with another television. In some examples, personal portable metering devices (PPMs), which are also known as portable metering devices or portable personal (or people) meters, are used to monitor media exposure of panelists to media. A PPM is an electronic device that is typically worn (e.g., clipped to a belt or other apparel) or carried by a panelist. The term "meter" as used herein refers generally to stationary meters and/or portable meters.

A panelist home may present challenges to the meters that monitor presentation devices. For example, a panelist home often includes multiple media presentation devices, each configured to present media to specific viewing and/or listening areas (e.g., a family room, a bedroom, a kitchen, etc.) located within the home. Meters that are located in one of the viewing and/or listening areas are configured to detect any media being presented in the viewing and/or listening area and to credit the media as having been presented. Thus, meters operate on the premise that any media detected by the meter is media that was presented in that particular viewing and/or listening area. However, in some cases, a meter may detect media that is emitted by a media presentation device that is not located within the viewing or listening proximity of a panelist in the room with the meter thereby causing the detected media to be improperly credited to the panelist currently associated with the monitored area (via, for example, a people meter).

The ability of the meter to detect media being presented outside of the viewing and/or listening proximity of the panelist is referred to as "spillover" because the media being presented outside of the viewing and/or listening proximity of the panelist is "spilling over" into the area occupied by the media identifying meter and may not actually fall within the attention of the panelist. Spillover may occur, for example, when a television in a particular room is powered off, but a meter associated with that television detects media being presented on a media presentation device in a different room of the panelist home or of an adjacent home (e.g., a neighbor's condominium or apartment). In such an example, the meter improperly credits the media as being presented on the media presentation device it monitors, even though no such presentation occurred.

Another effect, referred to as "hijacking," occurs when a meter detects different media being presented at multiple media presentation devices at the same time. For example, a meter in a kitchen may detect a particular media program being presented on a media presentation device in the kitchen, but the meter may also detect a different media program that is being presented on a different media presentation device in a living room. In such an example, the media presented by the media presentation device in the living room may, in some cases, have signals that overpower the signals associated with the media being presented by the media presentation device in the kitchen. As a result, the media identifying meter in the kitchen may be "hijacked" by the signals from the living room and the meter may inaccurately credit the media being presented in the living room and fail to credit the media being presented in the kitchen.

Example disclosed herein may be used to detect occurrences of spillover based on loudness and quietness characteristics of audio signal to more accurately credit media with exposure credits. An audio signal detected close to a media presentation device is characterized by short periods of relative loudness separated by short periods of relative quietness (e.g., periods of quiet between syllables in speech, etc.). As the audio signal from a media presentation device travels, reverberation is introduced into the audio signal as the audio signal propagates through the home of the panelist and reflects off some surfaces (e.g., walls, doors, etc.) and/or is absorbed by some surfaces (e.g., padded furniture, etc.). Characteristics of a room, such as open/closed doors, movement and/or placement of furniture, acoustic characteristics of room layouts, wall construction, floor coverings, ceiling heights, etc., affect quality of the audio signal. The reverberation reduces the detectability of the short periods of quietness because the reflections delay some audio components and add noise that may overlap with the periods of quietness. Thus, as an audio signal propagates through an environment and short periods of quietness are lost, and periods of loudness become longer.

In examples disclosed herein, a meter captures an audio signal of the media presentation through an audio capture device (e.g., a microphone). An example spillover manager of the meter detects periods of relative loudness and periods of relative quietness in the audio signal. To detect these periods, the spillover manager samples the audio signal at a sampling frequency (e.g., 2,000 samples per second, 8,000 samples per second, 40,000 samples per second, etc.). The example spillover manager determines a sample magnitude for each sample, where the sample magnitude is the absolute value of the amplitude of the audio signal at the sample.

Using the sample magnitude, the example spillover manager determines whether the corresponding sample is a loud sample or a quiet sample relative to previous sample values. If the previous sample (n−1) was a quiet sample, the example spillover manager determines that the current sample (n) is a loud sample if the difference between the value of the current sample (n) and the value of a pervious sample (n−1) satisfies (e.g., is greater than) a loud threshold. Otherwise, the example spillover manager determines that the current sample (n) is a quiet sample. If the previous sample (n−1) was a loud sample, the example spillover manager determines that the current sample (n) is a quiet sample if the sample value of the current sample (n) satisfies (e.g., is less than) a quiet threshold. Otherwise, the example spillover manager determines that the current sample (n) is a loud sample. The quiet threshold is set at a value below the sample value when the samples transitioned from a quiet sample to a loud sample. In this manner, when a next sample (n+1) is compared to the quiet threshold, the example spillover manager can detect relative periods of quietness even when the audio sample overall has a high amplitude (e.g., when the audio volume is loud). Alternatively, in some examples, the quiet threshold is set at a value below the highest sample value since the last transition from a quiet sample to a loud sample (e.g., the last peak value).

A period of loudness begins when the audio signal transitions from quiet to loud (e.g., the previous sample (n−1) is relatively quiet and the current sample (n) is relatively loud). In some examples, the period of loudness ends when the audio signal transitions from loud to quiet (e.g., the previous sample (n−1) is relatively loud and the current sample (n) is relatively quiet). Alternatively or additionally, in some examples, the period of loudness does not end until a threshold number of relatively quiet samples occur after the audio signal transitions from loud to quiet. For example, if after the audio signal transitions from loud to quiet, there are two relatively quiet samples followed by a relatively loud sample, the period of loudness may be considered not to have ended.

The period of loudness has a sample duration that is measured in the number of audio samples between the two transitions. For example, a period of loudness may have a sample duration of 1,837 samples. A time duration, in seconds, for a period of loudness depends on the sampling frequency of the audio signal. For example, if an audio signal is sampled at 8,000 samples per second, the period of loudness with a 1,837 sample duration has a 0.23 second duration. In some examples, the AME defines sample duration ranges (sometimes referred to as "sample duration buckets"). For example, duration ranges may be defined in 200 sample increments, (e.g., a 1-200 sample duration range, a 201-400 sample duration range, a 401-600 sample duration range, etc.). In such examples, the periods of loudness are assigned to a sample duration range based on the sample duration of the period of loudness. For example, a period of loudness with a 347 sample duration is assigned to a 201-400 sample duration range. In some such examples, a quantity of periods of loudness is tracked for each duration range. In some example, the samples of the audio signal and sample magnitudes corresponding to the period of loudness are discarded after assigning the period of loudness to a sample duration range.

The example spillover manager determines if spillover occurred for an interval of the audio signal (e.g., a one-second interval, a five-second interval, a ten-second interval, etc.). For example, the spillover manager may determine if spillover occurred in five-second intervals of the audio signal. For a particular interval, the example spillover manager identifies the periods of loudness in the interval, determines which of the periods of loudness have a short duration, and calculates a short loudness ratio ($R_{SL}$) based on the number of detected periods of loudness with a short time or sample duration and the total number of detected periods of loudness in accordance with Equation 1 below.

$$R_{SL} = \frac{POL_S}{POL_T} \qquad \text{Equation 1}$$

In Equation 1 above, $POL_S$ is the quantity of periods of loudness with a short time or sample duration, and $POL_T$ is the total quantity of periods of loudness. The example spillover manager determines that a period of loudness has a short time or sample duration if the period of loudness has a time or sample duration below a time or sample duration threshold. In some examples, the time or sample duration threshold is selected so that in blocks of the audio signal where spillover did not occur, the short loudness ratio is greater than a loudness ratio threshold (e.g., 50%, 66%, etc.).

For example, the sample duration threshold may be 1,800 samples. In such an example, the spillover manager designates periods of loudness with sample durations below 1,800 samples as having a short sample duration. For example, a five-second block of an audio sample may have 140 total periods of loudness and 76 periods of loudness with short sample durations. In such an example, the short loudness ratio is 54% (76/140×100%). In such an example, if the loudness ratio threshold is 50%, the spillover manager determines that spillover did not occur for that five second interval of the audio signal.

FIG. 1 depicts an example system 100 including example meters 102, 104, 106 that include corresponding spillover manager 107 to detect spillover and reduce media monitoring inaccuracies associated with incorrectly crediting media with exposure credit based on detecting spillover audio associated with that media. In the illustrated example, the meters 102, 104 are stationary meters that are placed in, on, and/or near media presentation devices 108, 110 (e.g., televisions, stereos, speakers, computers, game consoles, etc.) to monitor media (e.g., television programming, radio programming, movies, songs, advertisements, Internet-based programming such as websites and/or streaming media, etc.) presented by the media presentation devices 108, 110. In the illustrated example, a panelist 112 wears a personal portable metering device 106 (PPM), to monitor media presented by the media presentation devices 108, 110 near the panelist 112.

The example meters 102, 104, 106 process the detected media to extract codes and/or metadata, and/or to generate signatures for use in identifying the media and/or a station (e.g., a broadcaster) that provides the media. Identification codes, such as watermarks, ancillary codes, etc. may be embedded in or otherwise transmitted with media. Identification codes are data inserted into media to uniquely identify broadcasters and/or the media, and/or are provided with the media for other purposes such as tuning (e.g., packet identifier headers ("PIDs") used for digital broadcasting).

Codes are typically extracted using a decoding operation. Signatures are a representation of one or more characteristic(s) of the media signal (e.g., a characteristic of the frequency spectrum of the signal). Codes, metadata, signatures, etc. collected and/or generated by the meters 102, 104, 106 for use in identifying the media and/or a station that transmits the media are part of media exposure data collected by the meters 102, 104, 106.

In the illustrated example, the meters 102, 104, 106 are communicatively coupled with a home processing system 114 via a wireless and/or a hardwired connection. In illustrated example, the home processing system 114, from time to time, collects media exposure data from the meter(s) in a panelist home and communicates the collected media exposure data to an audience measurement entity (AME) 118 via a network 119 (e.g., the Internet, a local area network, a wide area network, a cellular network, etc.) via wired and/or wireless connections (e.g., a cable/DSL/satellite modem, a cell tower, etc.). Additionally or alternatively, in some examples, the meters 102, 104, 106 may communicate the collected media exposure data to the AME 118 via the network 119 (e.g., via a cellular network, etc.).

In the illustrated example, the AME 118 includes an example monitoring database 120 and an example server 122. The example server 122 collects the media exposure data from the meters 102, 104, 106 and stores the collected media exposure data in the example monitoring database 120. The example server 122 processes the collected media exposure data by comparing the codes, metadata, and/or signatures in the collected media exposure data to reference codes and/or signatures in a reference database to identify the media and/or station(s) that transmit the media. Examples to process the codes and/or signatures in the collected media exposure data are described in U.S. patent application Ser. No. 14/473,670, filed on Aug. 29, 2014, which is hereby incorporated herein by reference in its entirety. The example server 122 awards media exposure credits to media identified in the collected media exposure data. In some examples, the media exposure credits are associated with demographic information in the panelist database corresponding to a panelist 112 associated with the meters 102, 104, 106 that collected the media exposure data.

The example AME 118 maintains a panelist database to store panelist names, demographic information, and/or other information collected from panelists 112 during an enrollment process. During the enrollment process, the AME 118 of the illustrated example contracts and/or enlists panelists 112 to be part of the panelist database. Panelist 112 may be enrolled into the panelist database using any suitable technique (e.g., random selection, statistical selection, phone solicitations, Internet advertisements, surveys, advertisements in shopping malls, product packaging, etc.). Demographic information (e.g., gender, occupation, salary, race and/or ethnicity, marital status, highest completed education, current employment status, etc.) is obtained from the panelist 112 when the panelist 112 joins (e.g. enrolls in) a panel. Additionally, the demographic information may be obtained through various methods during the enrollment process (e.g., via a telephone interview, by having the panelist complete an online or paper survey, etc.).

In the example system 100 of FIG. 1, an example audio signal 124 of the media propagates from the media presentation device 108. The illustrated example of FIG. 1 shows two example paths that the audio signal 124 may take. The audio signal 124 of the illustrated example is detected by the example meter 102, which is relatively close to the media presentation device 108, and is detected by the example meters 104, 106 which are relatively far away (e.g., in another room) from the media presentation device 108 compared to the proximity of the meter 102 to the media presentation device 108. When the audio signal 124 is detected by the meter 102, the audio signal 124 is characterized by periods of relative loudness separated by short periods of quiet (e.g., periods of quiet between syllables in speech, etc.) because the meter 102 is close to the source (e.g., the media presentation device 108) of the media. As the audio signal 124 propagates farther away from its source, it is distorted by being reflected and/or defused off of hard surfaces (e.g., walls, ceilings, flooring, etc.), and/or being partially absorbed by soft surfaces (e.g., furniture, carpet, etc.). As the audio signal 124 is distorted, the relatively loud portions of the audio signal 124 overlap into the periods of quietness. As a result, fewer short periods of loudness are detectable in the distantly propagated audio signal 124, and periods of loudness that are observed in the distantly propagated audio signal tend to be the longer periods of loudness that have a longer time duration in the audio signal 124 when it was initially emitted by the media presentation device 108. This change in the periods of loudness characteristics is referred to herein as reverberation. Thus, the audio signal 124 detected at meters 104, 106 farther from (e.g., in a different room) the media presentation device 108 will be different than the audio signal 124 detected at the adjacent meter 102 due to reverberation characteristics in the distantly propagating audio signal 124.

For example, if the audio signal 124 is captured (e.g., via a microphone, etc.) by the example meter 102 near the media presentation device 108, the spillover manger 107 does not detect the reverberation characteristics and determines that spillover did not occur. As another example, if the audio signal 124 is captured by a distantly located meter 104, 106 that is located relatively far (e.g., in another room) from the media presentation device 108, the spillover manager 107 detects the reverberation characteristics and determines that spillover did occur. Examples to detect the reverberation characteristics are described below in connection with FIGS. 2, 3, and 4.

Figure 2:
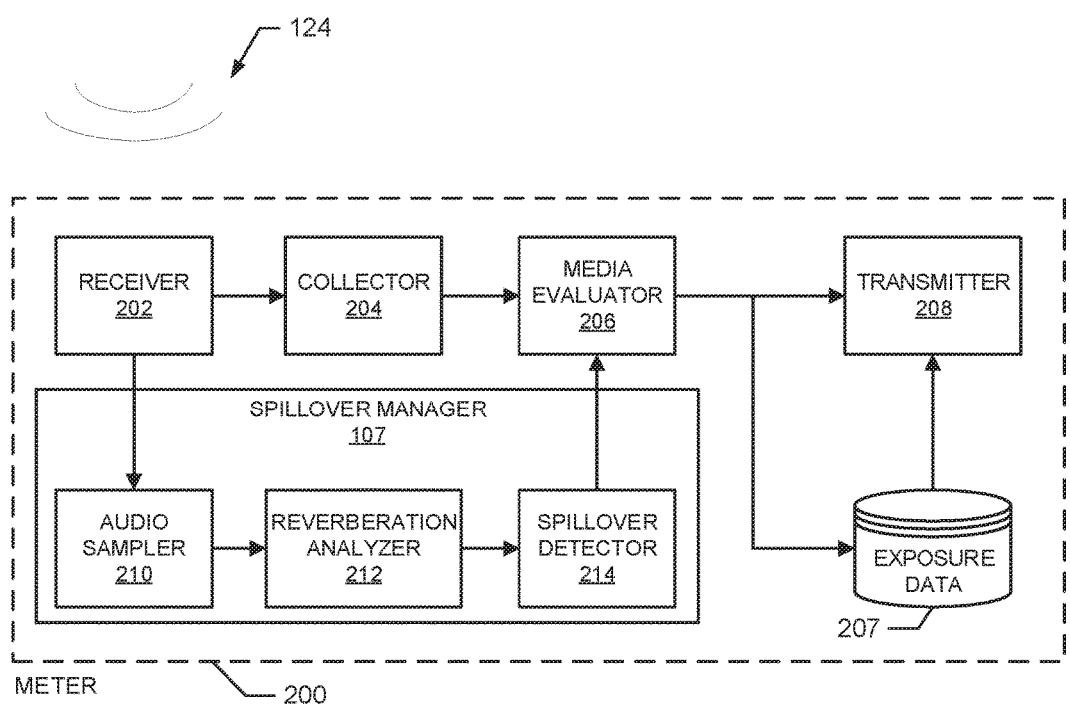
FIG. 2 illustrates an example implementation of an example meter of FIG. 1.

FIG. 2 illustrates an example implementation of an example meter 200 that include a spillover manager 107 to detect reverberation characteristics in an audio signal 124 indicative of spillover. The example meter 200 may be used to implement one or more of the example meters 102, 104, 106 of FIG. 1. For example, the example meter 200 may be a stationary meter (e.g., the meters 102, 104 of FIG. 1) or may be a portable meter (e.g., the meter 106 of FIG. 1). The example meter 200 includes an example receiver 202 (e.g., a microphone, etc.) to receive an audio signal 124 from media presentation devices (e.g., media presentation devices 108, 110 of FIG. 1). In the illustrated example, the meter 200 includes an example collector 204 to extract codes and/or signatures from the audio signal 124 received by the receiver 202. The extracted codes and/or signatures are used to identify broadcasters, channels, stations, and/or the media corresponding to the audio signal 124. The example collector 204 samples the audio signal 124 at a sampling frequency (e.g., 2,000 samples per second, 8,000 samples per second, 40,000 samples per second, etc.) to digitize the audio signal 124 to extract codes from the audio signal 124 and/or generate signatures based on the audio signal 124 in the digital domain. Examples of extracting codes and/or generating signatures are disclosed in U.S. Pat. No. 5,481,294, which is hereby incorporated herein by reference in its entirety. The example collector 204 extracts codes and/or generates signatures to generate and collect media exposure data for an interval (e.g., a one-second interval, a five-second interval, etc.) of the audio signal 124. For example, the collector 204 may extract a code and/or generate a signature for one-second periods to determine which media a panelist (e.g., the panelist 112 of FIG. 1) was exposed to over those one-second periods of time. In some examples, the collector 204 adds a timestamp to the exposure data with a time and/or date corresponding to when the audio signal 124 corresponding to the potential exposure was received.

The example meter 200 includes an example media evaluator 206 and an example media exposure database 207. The example media evaluator 206 marks (e.g., set a flag, etc.) media exposure data collected by the collector 204 to indicate that the media exposure data is usable to award exposure credit to the media identified by the media exposure data. In the illustrated example, the media evaluator 206 marks (e.g., sets a flag, etc.) the exposure data as usable for awarding exposure credit based on instructions from the spillover manager 107. In some examples, if the media evaluator 206 does not receive instructions to mark the media exposure data from the spillover manager 107 as usable for awarding exposure credit, the media evaluator 206 discards the media exposure data. In some examples, the media evaluator 206 adds identifying information (e.g., a meter identifier, a panelist identifier, etc.) to the media exposure data marked as usable for awarding exposure credit. The example media exposure database 207 stores the media exposure data. In some examples, the media exposure database 207 stores media exposure data marked by the mediate evaluator 206 as usable for awarding exposure credit. Alternatively, in some examples, the media exposure database 207 stores media exposure data regardless of whether the media exposure data is marked by the mediate evaluator 206 as usable for awarding exposure credit.

The example meter 200 includes an example transmitter 208 to transmit the media exposure data to the AME 118. In the illustrated example, from time to time (e.g., hourly, daily, weekly, etc.), the transmitter 208 sends media exposure data stored in the media exposure database 207 to the AME 118. Alternatively or additionally, in some examples, the transmitter 208 sends media exposure data as it is marked by the media evaluator 206 (e.g., if there the meter 200 is connected to a network). The example transmitter 208 transmits the media exposure data via wired networks (e.g., Ethernet, phone line, etc.) and/or wireless networks (e.g., Wide Area networks, cellular networks, etc.). In some examples, the transmitter 208 transmits the media exposure data to a base station (e.g., a stationary meter 102, 104, a home computer, a home processing system 114, etc.) via a wireless connection (e.g., Bluetooth, Near Field Communication, Wi-Fi, etc.) or via a wired connection (e.g., Universal Serial Bus (USB), etc.) so that the base station can send the media exposure data to the AME 118. In some examples, the transmitter 208 transmits all of the media exposure data regardless of whether it is marked as usable to award exposure credit so that the AME 118 can further analyze all of the media exposure data collected by the meter 200. In other examples, the transmitter 208 transmits only the media exposure data that the media evaluator 206 marked as being usable to award exposure data.

In the illustrated example of FIG. 2, the spillover manager 107 detects spillover based on the audio signal 124 and instructs the media evaluator 206 to mark the corresponding media exposure data as usable to award media exposure credit when spillover does not occur. The example spillover manager 107 includes an example audio sampler 210, an example reverberation analyzer 212, and an example spillover detector 214. The audio sample 210 of the illustrated example samples the audio signal 124 at a sampling frequency (e.g., 2,000 samples per second, 8,000 samples per second, 40,000 samples per second, etc.) that is sufficiently fast to detect reverberation characteristics. Alternatively, in some examples, the audio sampler 210 obtains the samples of the audio signal 124 generated by the collector 204. In some such examples, the audio sampler 210 obtains one sample out of every Nth samples (e.g., every other sample, one sample out of every ten samples, one sample out of every one hundred samples, etc.) produced by the collector 204. For example, if the audio sampler 210 receives samples of the audio signal 124 from the collector 204 that has a sampling frequency of 40,000 samples per second, the audio sampler 210 may obtain every 10th sample (e.g., 4,000 samples per second) and discard or ignore the remaining samples. The example audio sampler 210 determines the absolute value of the magnitude of each sample and organizes the samples into an audio block representing a time duration of the audio sample 124 (e.g., one second, five seconds, ten seconds, etc.) corresponding to the time duration of media exposure data generated by the collector 204. For example, audio samples provided by the audio sampler 210 correspond to a sampling frequency of 8,000 samples per second. In such examples, the audio sampler 210 may use every 10th sample and organize an audio block that includes five seconds worth of samples. In such examples, the audio block includes 4,000 samples.

In the illustrated example of FIG. 2, the reverberation analyzer 212 analyzes a portion of the audio signal 124 for spillover by determining whether reverberation characteristics are present in the portion of the audio signal 124. For example, the reverberation analyzer 212 obtains numerous audio blocks from the audio sampler 210 corresponding to different portions of the audio signal. The example reverberation analyzer 212 analyzes an audio block corresponding to a portion of the audio signal 124 to detect periods of loudness within the audio block. In the illustrated example, the reverberation analyzer 212 determines a quantity of the periods of loudness within the audio block have sample durations that satisfy (e.g., are less than) a duration threshold. The example reverberation analyzer 212 calculates a ratio for the audio block by dividing the quantity of the periods of loudness that satisfy the duration threshold within the audio block by the total number of periods of loudness detected in the audio block as shown in Equation 1 above.

In the illustrated example, the example reverberation analyzer 212 determines that a period of loudness starts when a previous sample (n−1) is determined to be relatively quiet and the current sample (n) is determined to be relatively loud. In some examples, the example reverberation analyzer 212 determines that the period of loudness ends when a previous sample (n−1) is determined to be relatively loud and the current sample (n) is determined to be relatively quiet. Alternatively or additionally, in some examples, the period of loudness does not end until a threshold number of relatively quiet samples occur after the audio signal transitions from loud to quiet.

The sample duration of a period of loudness is the number of samples between the beginning of the period of loudness and the end of the period of loudness. For example, if the reverberation analyzer 212 determines that the 257th sample in an audio block is relatively quiet and the 258th sample of the audio block is relatively loud, the reverberation analyzer 212 would determine that a period of loudness begins at the 258th sample. If, for example, the reverberation analyzer 212 determines that the 663rd sample in the same audio block is relatively loud and the 664th sample of the audio block is relatively quiet, the reverberation analyzer 212 determines that the period of loudness ends at the 663rd sample. In such an example, the reverberation analyzer 212 determines that the period of loudness begins at the 258th sample and ends at the 663th sample has a sample duration of 406 samples (664th sample-258th sample). In some examples, the reverberation analyzer 212 determines that the period of quiet ends after it detects a threshold number (e.g., three, five, ten, etc.) of quiet samples after the audio samples in the audio block transition from a relatively loud sample to a relatively quiet sample. For example, if the reverberation analyzer 212 determines that the 667th sample of the audio block is relatively loud, the reverberation analyzer 212 may determine that the period of loudness did not end because the number of relatively quiet samples do not satisfy (e.g., are not greater than) a threshold number of quiet samples.

The example reverberation analyzer 212 determines that a sample is loud if the previous sample (n−1) is relatively quiet and the magnitude of the current sample (n) satisfies (e.g., is greater than) a loud threshold. The example reverberation analyzer 212 determines the loud threshold based on the amplitude of the quiet sample when the audio signal 124 last transitioned from a relatively loud sample to a relatively quiet sample. Alternatively, in some examples, the example reverberation analyzer 212 determines the loud threshold based on the sample with the lowest magnitude since the current period of quietness began. In some examples, the loud threshold is a percentage above the lowest magnitude. For example, if the sample with the lowest magnitude since the current period of quietness began has a magnitude of 100 and the loud threshold is based on a 20% increase in magnitude, the reverberation analyzer 212 sets the loud threshold to 120.

The example reverberation analyzer 212 determines that a sample is quiet if the previous sample (n−1) is relatively loud and the magnitude of the current sample (n) satisfies (e.g., is less than) a quiet threshold. The example reverberation analyzer 212 determines the quiet threshold based on the amplitude of the loud sample when the audio signal 124 last transitioned from a relatively quiet sample to a relatively loud sample. Alternatively, in some examples, the example reverberation analyzer 212 determines the quiet threshold based on the sample with the highest magnitude since the most recent period of quiet ended. In some examples, the quiet threshold is a percentage less than the highest magnitude. For example, if the sample with the highest magnitude since the most recent period of quietness ended has a magnitude of 1000 and the quiet threshold is based on a 50% decrease in magnitude, the reverberation analyzer 212 sets the quiet threshold to 500.

In some examples, to track transitions between a relatively quiet samples and a relatively loud samples, the reverberation analyzer 212 maintains a loudness flag. In such examples, when a previous sample (n−1) is relatively quiet and the current sample (n) is relatively loud, the reverberation analyzer 212 sets the loudness flag to a loud-indicator value (e.g., a binary value representing the occurrence of a relatively loud sample). Additionally, in such examples, when a previous sample (n−1) is relatively loud and the current sample (n) is relatively quiet, the reverberation analyzer 212 set the loudness flag to a quiet-indicator value (e.g., a binary value representing the occurrence of a relatively quiet sample). In such examples, the reverberation analyzer 212 uses the loudness flag when determining whether the current sample (n) is loud or quiet instead of referring to the previous sample (n−1). For example, if the loudness flag is set to a loud-indicator value, the reverberation analyzer 212 compares the magnitude of the current sample (n) to the quiet threshold.

In some examples, the AME 118 defines sample or time duration ranges for the sample or time durations of the periods of loudness detected by the reverberation analyzer 212. A sample or time duration range encompasses a range of sample or time durations. For example, the AME 118 may define sample ranges in increments of 200 samples (e.g., a 1-200 sample duration range, a 201-400 sample duration range, etc.). The sample or time duration ranges are associated with a corresponding counter that the example reverberation analyzer 212 uses (e.g., increments) to track quantities of periods of loudness in an audio block that fit within the sample or time duration ranges. In such examples, when determining the duration of a period of loudness, the reverberation analyzer 212 increments the corresponding counter for the sample or time duration range in which the period of loudness fits. For example, if the reverberation analyzer 212 determines that a period of loudness has a sample duration of 406 samples, the reverberation analyzer 212 increments a counter corresponding to a 401-600 sample duration range. In such a manner, the reverberation analyzer 212 does not need to retain the specific durations of each period of loudness in the audio block. In such examples, the reverberation analyzer 212 calculates the short loudness ratio ($R_{SL}$) by dividing the quantity of periods of loudness in the sample or time duration ranges that are below a sample or time duration threshold by the total quantity of periods of loudness identified using the counters corresponding to the duration ranges as shown in Equation 1 above. Table 1 below illustrates example sample duration ranges and corresponding counter values calculated by the reverberation analyzer 212 to determine how many period of loudness occurred in an audio block.

TABLE 1

EXAMPLE AUDIO BLOCK ANALYZED BY THE REVERBERATION ANALYZER

| Sample Duration Ranges of Periods of Loudness | Number of Periods of Loudness Detected (counter values) |
| --- | --- |
| 2501-3000 | 1 |
| 2001-2500 | 3 |
| 1501-2000 | 7 |
| 1001-1500 | 8 |
| 501-1000 | 4 |
| 1-500 | 2 |

In the examples illustrated in Table 1 above, if the sample duration threshold is 1500 samples, the reverberation analyzer 212 calculates the short loudness ratio ($R_{SL}$) for the audio block to be 56% ((14)/(25)) based on Equation 1 above.

In the illustrated example, the spillover detector 214 obtains the short loudness ratio ($R_{SL}$) for the audio block calculated by the reverberation analyzer 212 to determine if spillover occurred in the portion of the audio signal 124 corresponding to the audio block and the media exposure data generated by the collector 204. To determine if spillover occurred, the example spillover detector 214 compares the short loudness ratio ($R_{SL}$) obtained from the reverberation analyzer 212 with an example reverberation threshold. An example reverberation threshold is set (e.g., by the AME 118) so that it will be satisfied when the meter 200 receives an audio signal 124 from a media presentation device 108, 110 that is sufficiently near the meter 200 such that the audio signal 124 is detected by the meter 200 in the same room in which it is emitted by the media presentation device 108, 110 meaning that the detected audio signal is not spillover from another room. In some examples, a reverberation threshold of 50% is sufficient to distinguish between spillover audio and non-spillover audio. In such examples, a 50% reverberation threshold means that 50% of the detected periods of loudness in an audio block were determined to be short periods of loudness. If the example spillover detector 214 determines that spillover did not occur, the example spillover detector 214 instructs the example media evaluator 206 to mark the corresponding media exposure data as usable to award exposure credit to corresponding media. In some examples, if the spillover detector 214 determines that spillover did occur, the example spillover detector 214 instructs the media evaluator 206 to mark the corresponding media exposure data as invalid (e.g., as corresponding to spillover) or unusable to award exposure credit to corresponding media.

While an example manner of implementing the example meter 200 of FIG. 2 is illustrated in FIG. 2, one or more of the elements, processes and/or devices illustrated in FIG. 2 may be combined, divided, re-arranged, omitted, eliminated and/or implemented in any other way. Further, the example receiver 202, the example collector 204, the example media evaluator 206, the example transmitter 208, the example spillover manager 107 and/or, more generally, the example meter 200 of FIG. 2 may be implemented by hardware, software, firmware and/or any combination of hardware, software and/or firmware. Thus, for example, any of the example receiver 202, the example collector 204, the example media evaluator 206, the example transmitter 208, the example spillover manager 107 and/or, more generally, the example meter 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 202, the example collector 204, the example media evaluator 206, the example transmitter 208, and/or the example spillover manager 107 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 200 of FIG. 2 may include one or more elements, processes and/or devices in addition to, or instead of, those illustrated in FIG. 2, and/or may include more than one of any or all of the illustrated elements, processes and devices.

While an example manner of implementing the example spillover manager 107 of FIG. 1 is illustrated in FIG. 2, one or more of the elements, processes and/or devices illustrated in FIG. 2 may be combined, divided, re-arranged, omitted, eliminated and/or implemented in any other way. Further, the example audio sampler 210, the example reverberation analyzer 212, the example spillover detector 214 and/or, more generally, the example spillover manager 107 of FIG. 1 may be implemented by hardware, software, firmware and/or any combination of hardware, software and/or firmware. Thus, for example, any of the example audio sampler 210, the example reverberation analyzer 212, the example spillover detector 214 and/or, more generally, the example spillover manager 107 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sampler 210, the example reverberation analyzer 212, and/or the example spillover detector 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example spillover manager 107 of FIG. 1 may include one or more elements, processes and/or devices in addition to, or instead of, those illustrated in FIG. 2, and/or may include more than one of any or all of the illustrated elements, processes and devices.

Figure 3A:
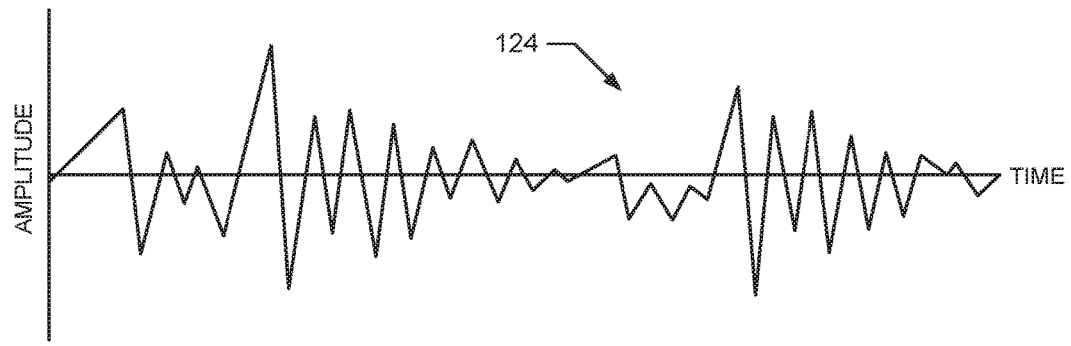
FIGS. 3A, 3B, and 3C illustrate an example portion of an audio signal analyzed by the example spillover manager of FIGS. 1 and 2.
Figure 3B:
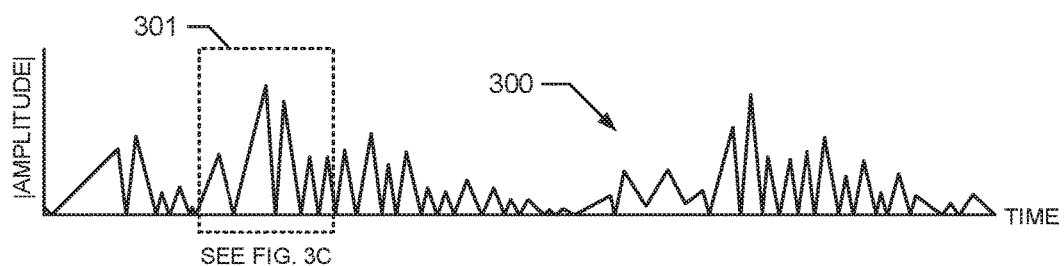
Figure 3C:
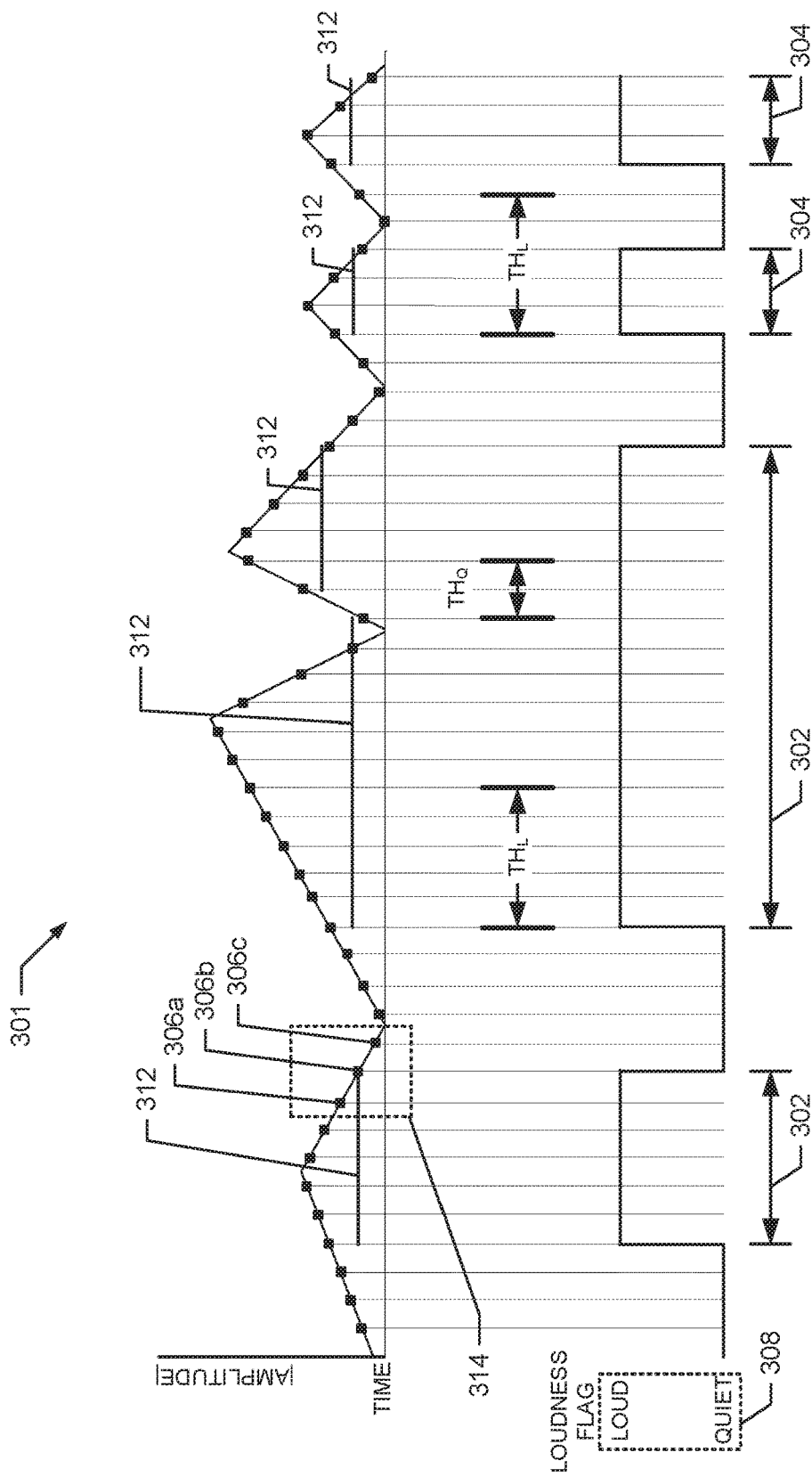

FIGS. 3A, 3B, and 3C illustrate an example portion of an example audio signal 124 analyzed by the example spillover manager 107 of FIGS. 1 and 2. In the illustrated example of FIG. 3A, the audio signal 124 does not have reverberation characteristics. The example audio sampler 210 (FIG. 2) calculates an absolute magnitude audio signal 300 shown in FIG. 3B by calculating the absolute values of the amplitudes of the audio signal 124. The illustrated examples in FIG. 3C shows how the example reverberation analyzer 212 (FIG. 2) detects long periods of loudness 302 and short periods of loudness 304 in a portion 301 of the absolute magnitude audio signal 300.

FIG. 3C illustrates a blown up view of the portion 301 of the absolute magnitude audio signal 300 of FIG. 3B. In the illustrated example of FIG. 3C, a plurality of samples (e.g., samples 306a, 306b, 306c) form a portion of an audio block corresponding to the portion 301 of the absolute magnitude audio signal 300. The illustrated example of FIG. 3C shows example long periods of loudness 302 and example short periods of loudness 304. The illustrated example also shows a loudness flag 308 to track the state of the previous sample (n−1) used to determine whether a current sample (n) in the audio block is a relatively loud sample or a relatively quiet sample. The example loudness flag 308 is also used to determine whether to (i) compare the amplitude of the current sample (n) to the quiet threshold 312, or (ii) compare the amplitude of the current sample (n) to the amplitude of a previous sample (n−1).

The example audio sampler 210 samples the absolute magnitude audio signal 300 at a sampling frequency to create the audio block of the samples. In the illustrated example, to analyze the audio block, the example reverberation analyzer 212 compares the current sample (n) to either the quiet threshold or the amplitude of the pervious sample (n−1) based on the current state of the loudness flag 308. If the example loudness flag 308 is set to a quiet-indicator value (e.g., QUIET), the example reverberation analyzer 212 compares the amplitude of the current sample (n) to the amplitude of the previous sample (n−1). If the example loudness flag 308 is set to a loud-indicator value (e.g., LOUD), the example reverberation analyzer 212 compares the current sample (n) to a current quiet threshold 312.

In the illustrated example of FIG. 3C, the loudness flag 308 was set to LOUD when the difference between the amplitude of the current sample (n) to the amplitude of the previous sample (n−1) satisfies (e.g., is greater than) a loud threshold. In some examples, the value of the loud threshold is a fixed value defined by the AME 118 (FIG. 1) or any other suitable organization. Alternatively, the value of the loud threshold is relative to the different between the amplitudes of the current sample (n) and the previous sample (n−1) when the loudness flag 308 was set to quiet.

In the illustrated example, the quiet threshold 312 is a value relative to the amplitude of the sample when the loudness flag 308 was set to LOUD. For example, the quiet threshold 312 may be 80% of the amplitude of the sample when the loudness flag 308 was set to LOUD. An example is illustrated in box 314. In the example, the first sample 306a in the box 314 does not satisfy the quiet threshold 312. Therefore, the loudness flag 308 remains set at LOUD. In the example, the second sample 306b in the box 314 satisfies the quiet threshold 312 and the loudness flag 308 is set to QUIET. Therefore, the example reverberation analyzer 212 identifies the second sample 306b as a start of a period of quietness. In the example, the third sample 306c in the box 314 is compared to the loud threshold. Because the difference between the amplitude of the third sample 306c and the second sample 306b is not greater than the loud threshold, the loudness flag 308 remains set at QUIET.

In the illustrated example, when the loudness flag 308 transitions from the QUIET setting to the LOUD setting, the reverberation analyzer 212 counts the number of samples for which the loudness flag 308 is set to LOUD. The example reverberation analyzer 212 compares that number of samples to a long threshold ($TH_L$). If the loudness flag 308 transitions from the LOUD setting to the QUIET setting before the number of samples satisfies the long threshold ($TH_L$), the example reverberation analyzer 212 determines that the particular period of loudness is a short period of loudness 304. Otherwise, if the number of samples satisfies the long threshold ($TH_L$) before the loudness flag 308 transitions from the LOUD setting to the QUIET setting, the example reverberation analyzer 212 determines that the particular period of loudness is a long period of loudness 302.

In some examples, the example reverberation analyzer 212 determines whether, after the loudness flag 308 transitions from the LOUD setting to the QUIET setting, the loudness flag 308 transitions from the QUIET setting to the LOUD setting before a number of samples satisfies a quiet length threshold ($TH_Q$). If the loudness flag 308 transitions from the QUIET setting to the LOUD setting before the number of samples satisfies the quiet length threshold ($TH_Q$), example reverberation analyzer 212 determines that the particular period of loudness did not end and continues to count the number of samples for which the loudness flag 308 is set to LOUD. Otherwise, if the loudness flag 308 does not transition from the QUIET setting to the LOUD setting before the number of samples satisfies the quiet threshold ($TH_Q$), example reverberation analyzer 212 determines that the particular period of loudness did end.

Figure 4A:
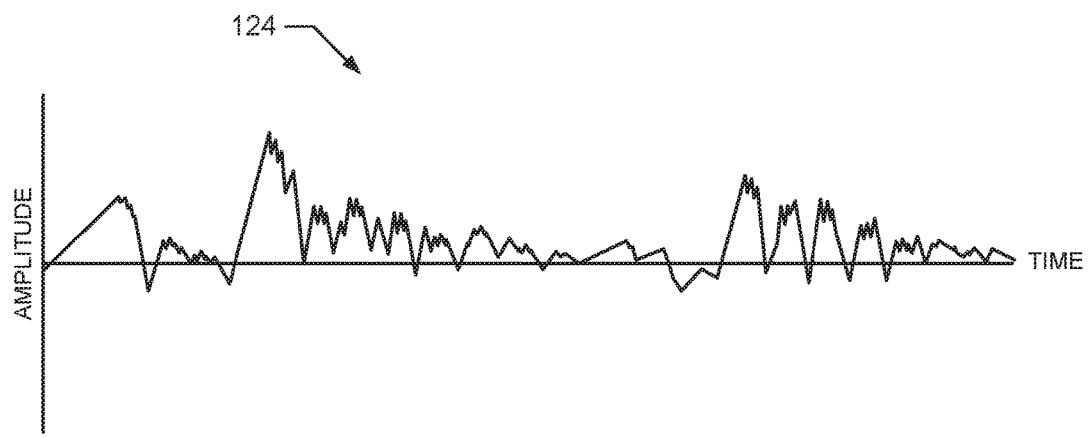
FIGS. 4A, 4B, and 4C illustrate another example portion of an audio signal analyzed by the example spillover manager of FIGS. 1 and 2.
Figure 4B:
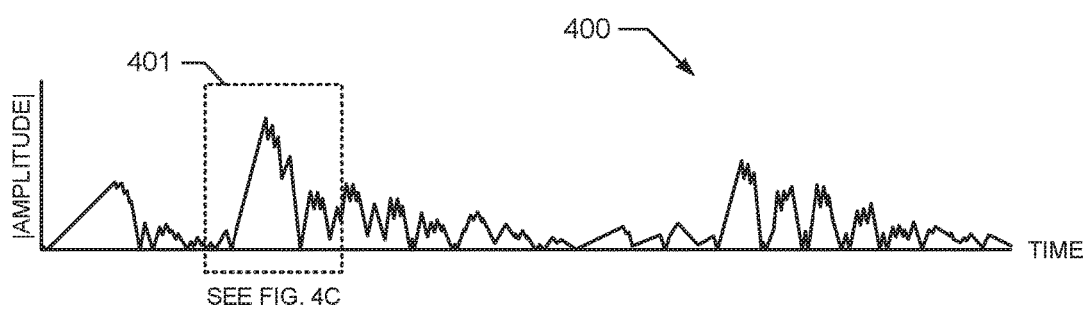
Figure 4C:
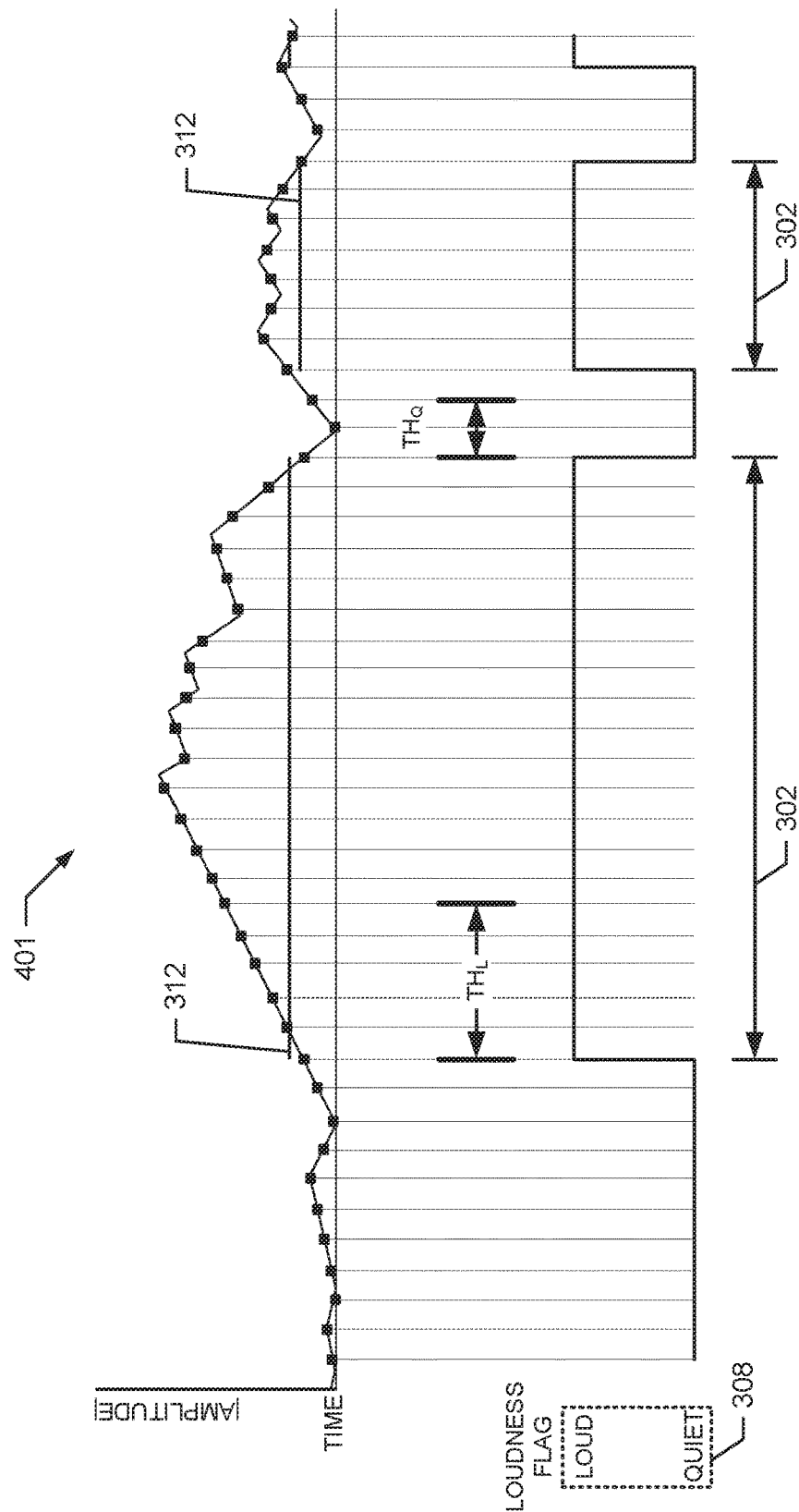

FIGS. 4A, 4B, and 4C illustrate another example portion of an example audio signal 124 analyzed by the example spillover manager 107 of FIGS. 1 and 2. In the illustrated example of FIG. 4A, the audio signal 124 has reverberation characteristics. The example audio sampler 210 (FIG. 2) calculates an absolute magnitude audio signal 400 by calculating the absolute values of the amplitudes of the audio signal 124 shown in FIG. 4B. The examples illustrated in FIG. 4C shows how the example reverberation analyzer 212 (FIG. 2) detects long periods of loudness 302 and short periods of loudness 304 in a portion 401 of the absolute magnitude audio signal 400 having reverberation characteristics.

FIG. 4C illustrates a blown up view of the portion 401 of the absolute magnitude audio signal 400 of FIG. 4B. In the illustrated example of FIG. 4C, the plurality of samples form a portion of an audio block corresponding to the portion 401 of the absolute magnitude audio signal 400. The illustrated example of FIG. 4C shows example long periods of loudness 302. In the illustrated examples, reverberation characteristics have eliminated the short periods of loudness 304 (FIG. 3C) in the blown up view of the portion 401. The illustrated example also shows the loudness flag 308 to track the state of the previous sample (n−1) used to determine whether a current sample (n) in the audio block is a relatively loud sample or a relatively quiet sample.

The example audio sampler 210 samples the absolute magnitude audio signal 400 at a sampling frequency to create the audio block. In the illustrated example, to analyze the audio block, the example reverberation analyzer 212 either i) compares the amplitude of the current sample (n) to the quiet threshold 312, or (ii) compares the amplitude of the current sample (n) to the amplitude of a previous sample (n−1) based on the current state of a loudness flag 308. If the example loudness flag 308 is set to a quiet-indicator value (e.g., QUIET), the example reverberation analyzer 212 compares the difference between the amplitude of the current sample (n) and the amplitude of the previous sample (n−1) to the loud threshold. If the example loudness flag 308 is set to a loud-indicator value (e.g., LOUD), the example reverberation analyzer 212 compares the current sample (n) to a current quiet threshold 312. In the illustrated example of FIG. 4C, the loud threshold is a fixed value (e.g., 500, 1000, etc.). In the illustrated example, the quiet threshold 312 is a value relative to the amplitude of the audio signal 124 when the loudness flag 308 was set to LOUD. In the example illustrated in FIG. 4C, because the audio signal 124, and thus the absolute magnitude audio signal 400, has reverberation characteristics, the total number of periods of loudness tend to be fewer and/or longer (e.g., than the absolute value audio signal 300 of FIGS. 3B and 3C) As a result, as illustrated in FIG. 4C, the relative quantity of the short periods of loudness 304 also tend to be fewer.

Figure 5:
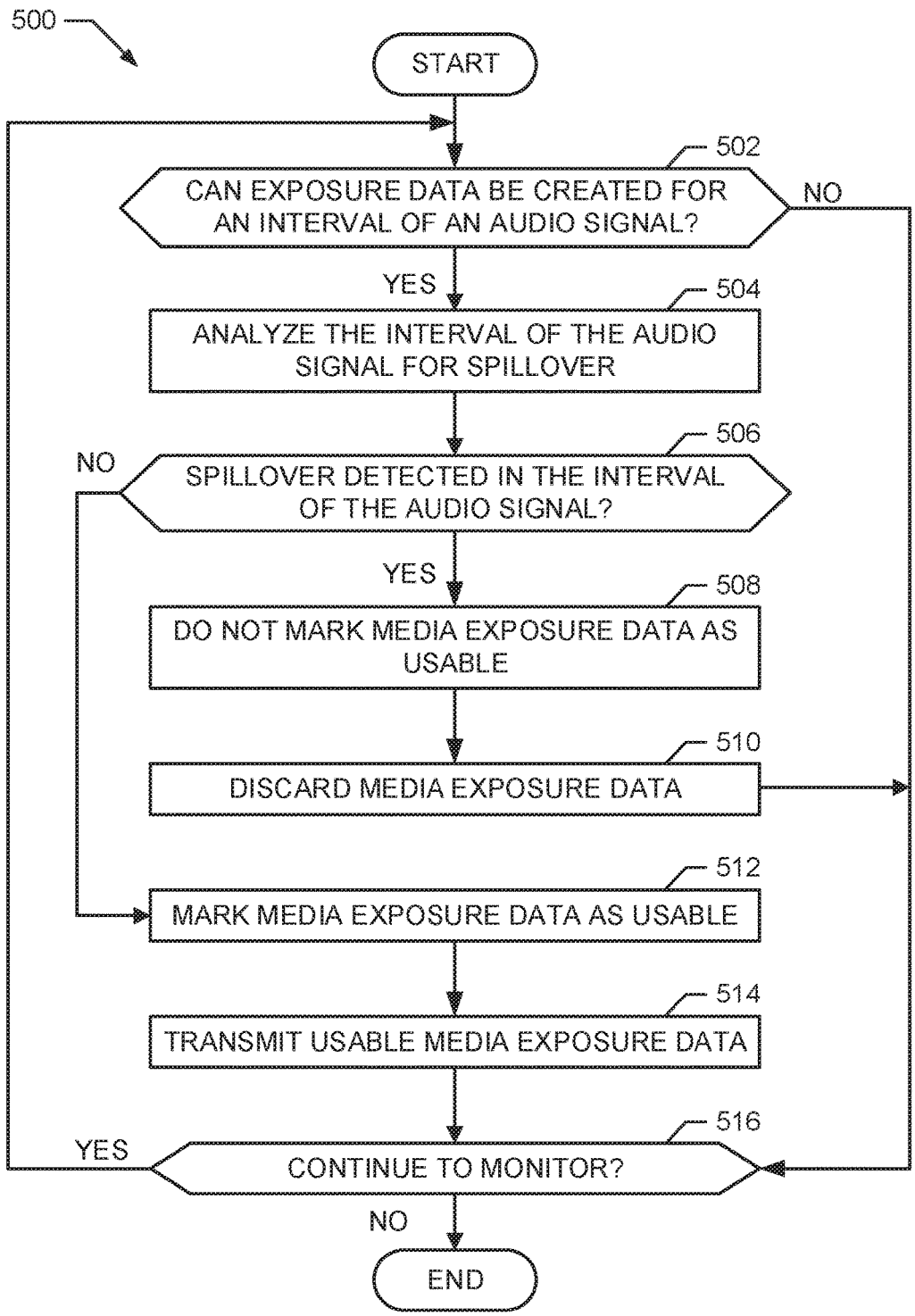
FIG. 5 is a flow diagram representative of example machine readable instructions that may be executed to implement the example meter of FIGS. 1 and 2 to award media with media exposure credit.
Figure 6:
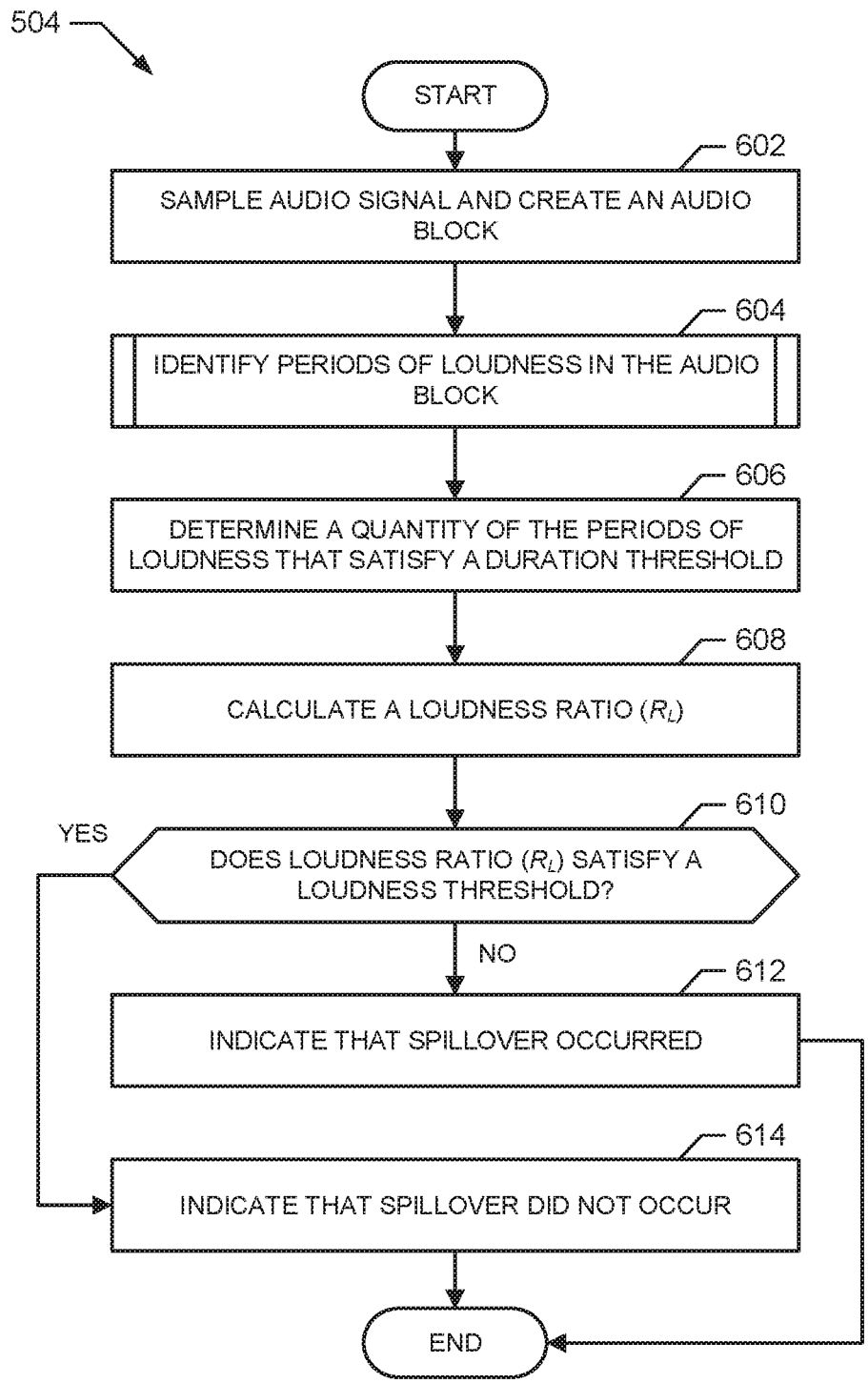
FIG. 6 is a flow diagram representative of example machine readable instructions that may be executed to implement the example spillover manager of FIGS. 1 and 2 to detect spillover.
Figure 7A:
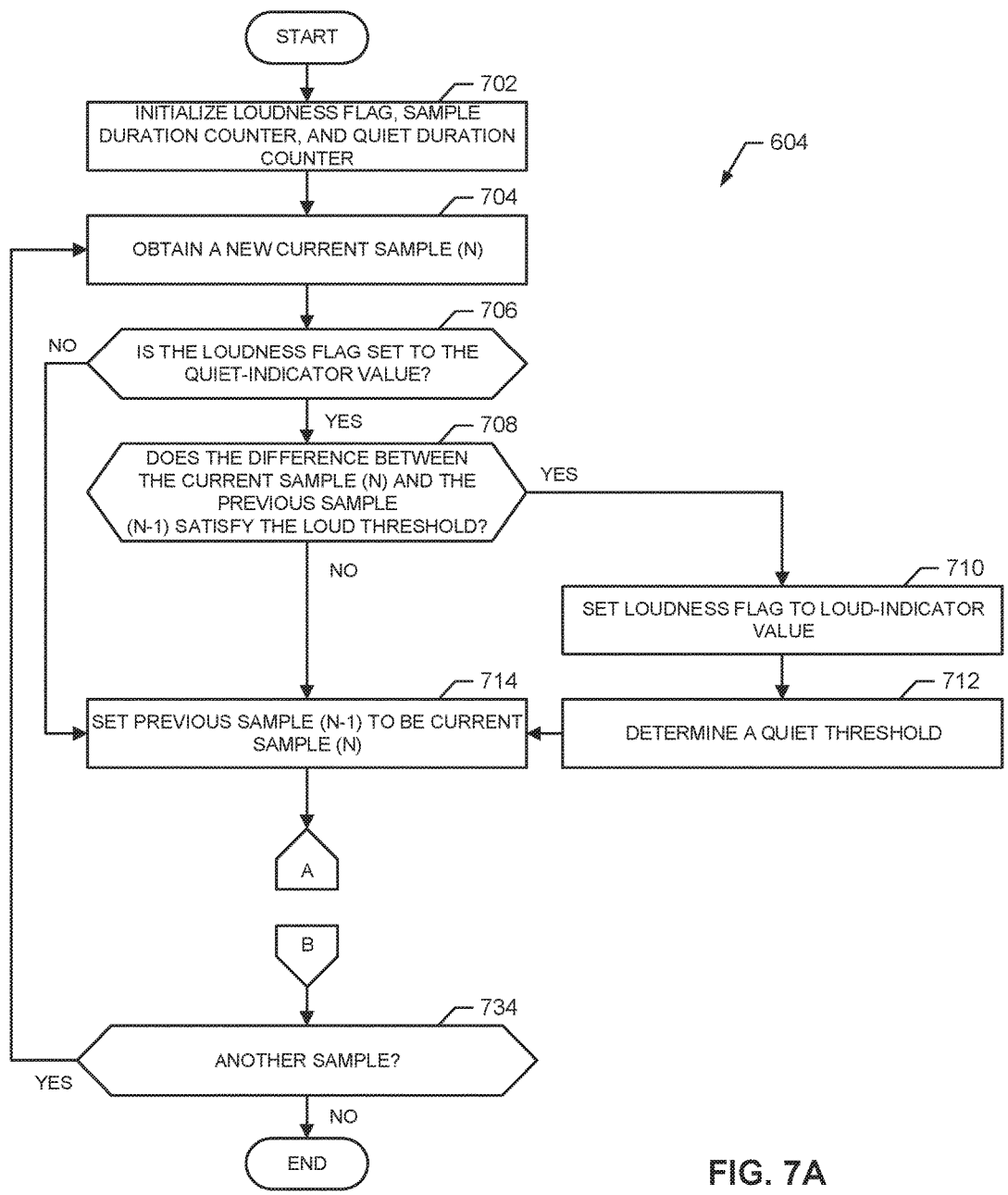
FIGS. 7A and 7B are flow diagrams representative of example machine readable instructions that may be executed to implement the example reverberation analyzer of FIG. 2 to detect periods of loudness in an audio signal.
Figure 7B:
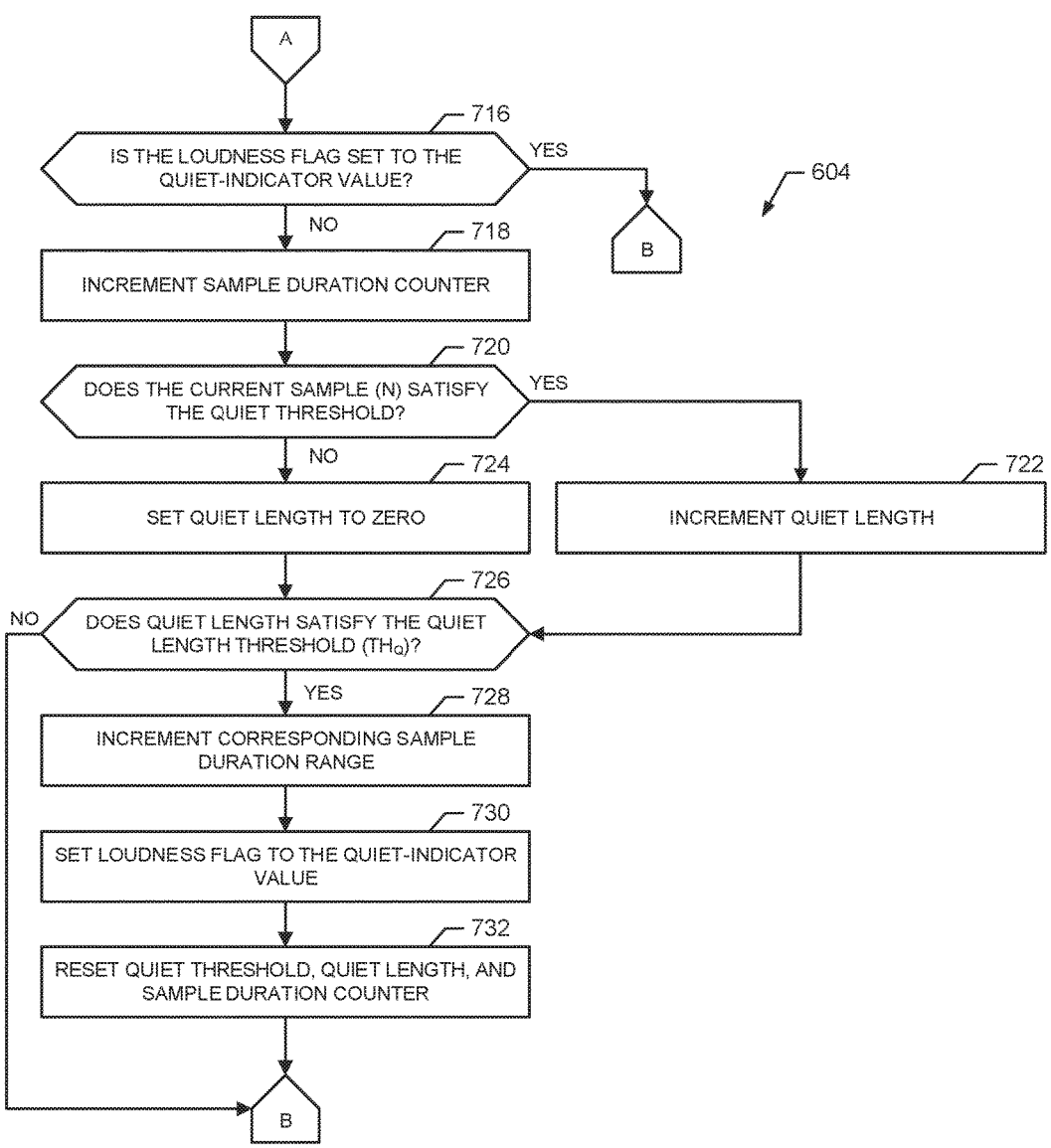

A flowchart representative of example machine readable instructions for implementing the example meter 200 of FIG. 2 is shown in FIG. 5. Flowcharts representative of example machine readable instructions for implementing the example spillover manager 107 of FIGS. 1 and 2 are shown in FIGS. 6, and 7A, 7B. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 5, 6, 7A, and 7B many other methods of implementing the example meter 200 and/or the example spillover manager 107 may alternatively be used. For example, the order of execution of the blocks may be changed, and/or some of the blocks described may be changed, eliminated, or combined.

As mentioned above, the example processes of FIGS. 5, 6, 7A, and 7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5, 6, 7A and 7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flow diagram representative of example machine readable instructions 500 that may be executed to implement the example meter 200 of FIG. 2 to create media exposure data usable to award exposure credit to the corresponding media. The example meter 200 may be a stationary meter (e.g., the meters 102, 104 of FIG. 1) or a portable meter (e.g., the meter 106 of FIG. 1). The meter 200 uses the spillover manager 107 (FIGS. 1 and 2) to reduce media monitoring inaccuracies by detecting spillover and indicating that media exposure data is usable to award exposure credit to the corresponding media when spillover does not occur. Initially, at block 502, the example collector 204 determines whether media exposure data can be created for a time-based interval (e.g., a one-second interval, a five-second interval, etc.) of an audio signal 124. The example collector 204 determines that media exposure data can be created if a code can be extracted and/or signature can be generated from the time-based interval of audio signal 124 being analyzed. If exposure data can be created for the time-based interval of the received audio signal 124, program control advances to block 504. Otherwise, if media exposure data cannot be created for the time-based interval of the audio signal 124, program control advances to block 516.

At block 504, the example spillover manager 107 analyzes the time-based interval of the audio signal 124 analyzed by the collector 204 to detect whether spillover has occurred. Example methods to detect if spillover occurred are described below in connection with FIGS. 6, and 7A, 7B, 7C. At block 506, the spillover manager 107 determines whether was spillover detected in the time-based interval of the audio signal analyzed at block 504. If the example spillover manager 107 determines that spillover occurred, program control advances to block 508. Otherwise, if the example spillover manager 107 determines that spillover did not occur, program control advances to block 512. At block 508, the example media evaluator 206 does not mark the exposure data as usable to award exposure credit to the correspond media. At block 510, the example media evaluator 206 discards the media exposure data. Program control then advances to block 516.

At block 512, the media evaluator 206 marks the media exposure data as usable to award exposure credit to the corresponding media. At block 514, the example transmitter 208 transmits the media exposure data marked as usable to award exposure credit to the corresponding media to the AME 118. At block 516, the meter 200 determines whether to continue to monitor for media. For example, the meter 200 determines whether it can still detect the audio signal 124. If the meter 200 determines that it is to continue to monitor for media, program control returns to block 502; otherwise, example program 500 ends.

FIG. 6 is a flow diagram representative of example machine readable instructions 504 that may be executed to implement the example spillover manager 107 of FIGS. 1 and 2 to detect spillover in an audio signal 124. Initially, at block 602, the example audio sampler 210 samples (e.g., digitizes the audio signal 124 using a sampling frequency) a time-based interval of the audio signal 124 to generate an audio block of samples representative of the time-based interval of the audio signal 124. At block 604, the example reverberation analyzer 212 analyzes the audio block generated at block 602 to identify the periods of loudness in the audio block. An example method to identify the periods of loudness in the audio block is described below in connection with FIGS. 7A, 7B, and 7C. At block 606, the example reverberation analyzer 212 determines a quantity of the periods of loudness identified at block 604 that satisfy the duration threshold. At block 608, the example reverberation analyzer 212 calculates a short loudness ratio ($R_{SL}$) by dividing the quantity of the periods of loudness that satisfy a duration threshold determined at block 606 by a total number periods of loudness in the audio block identified at block 604.

At block 610, the example spillover detector 214 determines whether the short loudness ratio ($R_{SL}$) calculated at block 608 satisfies (e.g., is greater than) a loud threshold. If the example spillover detector 214 determines that the short loudness ratio ($R_{SL}$) does not satisfy (e.g., is less than) the loud threshold, program control advances to block 612. Otherwise, if the example spillover detector 214 determines that the short loudness ratio ($R_{SL}$) does satisfy (e.g., is greater than) the loud threshold, program control advances to block 614. At block 612, the spillover detector 214 indicates (e.g., sends an instruction to the media evaluator 206 of FIG. 2) that spillover occurred in the portion of the audio signal 124 corresponding to the audio block generated by the audio sampler 210 at block 602. The example program 600 then ends. At block 612, the spillover detector 214 indicates (e.g., sends an instruction to the media evaluator 206) that spillover did not occur in the portion of the audio signal 124 corresponding to the audio block generated by the audio sampler 210 at block 602. The example program 600 then ends.

FIGS. 7A and 7B are flow diagrams representative of example machine readable instructions 604 that may be executed to implement the example reverberation analyzer 212 of FIG. 2 to detect periods of loudness in an audio signal (e.g., the audio signal 124 of FIGS. 1 and 2). Initially, at block 702 (FIG. 7A), the example reverberation analyzer 212 initializes the loudness flag (e.g., the loudness flag 308 of FIGS. 3C and 4C), the sample duration counter, and the quiet duration counter. In some examples, the loudness flag 308 is set to the quiet-indicator value, the sample duration counter is set to zero, and/or the quiet duration counter is set to zero. At block 704, the example reverberation analyzer 212 obtains a new current sample (n) (e.g. the next sample to be analyzed) from the audio block. At block 706, the example reverberation analyzer 212 determines whether the loudness flag 308 is set to the quiet-indicator value. If the loudness flag 308 is set to the quiet-indicator value, program control advances to block 708. Otherwise, if the loudness flag 308 is not set to the quiet-indicator value, program control advances to block 714.

At block 708, the example reverberation analyzer 212 determines whether the difference between the amplitude of the current sample (n) and the previous sample (n−1) satisfies (e.g., is greater than) the loud threshold. If the difference between the amplitude of the current sample (n) and the previous sample (n−1) satisfies the loud threshold, program control advances to block 710. Otherwise, if the difference between the amplitude of the current sample (n) and the previous sample (n−1) does not satisfy (e.g., is less than or equal to) the loud threshold, program control advances to block 714. At block 710, the example reverberation analyzer 212 sets the loudness flag to the loud-indicator value. At block 712, the example reverberation analyzer 212 determines the quiet threshold (e.g., the quiet threshold 312 of FIGS. 3C and 4C). In some examples, the quiet threshold is a percentage of the amplitude of the current sample (n). For example, the quiet threshold may be 80% of the amplitude of the current sample (n). At block 714, the example reverberation analyzer 212 sets the previous sample (n−1) to be the current sample (n). Program control then advances to block 716 (FIG. 7B).

At block 716, the example reverberation analyzer 212 determines whether the loudness flag 308 is set to the quiet-indicator value. If the loudness flag 308 is set to the quiet-indicator value, program control advances to block 734 (FIG. 7A). Otherwise, if the loudness flag 308 is set to the loud-indicator value, program control advances to block 718. At block 718, the example reverberation analyzer 212 increments the sample duration counter. At block 720, the example reverberation analyzer 212 determines whether the amplitude of the current sample (n) satisfies (e.g. is less than) the quiet threshold 312. If the amplitude of the current sample (n) satisfies the quiet threshold 312, program control advances to block 722. Otherwise, if the amplitude of the current sample (n) does not satisfy the quiet threshold 312, program control advances to block 724. At block 722, the example reverberation analyzer 212 increments the quiet length. At block 724, the example reverberation analyzer 212 sets the quiet length to zero.

At block 726, the example reverberation analyzer 212 determines whether the quiet length satisfies a quiet length threshold ($TH_Q$). If the quiet length satisfies the quiet length threshold ($TH_Q$), program control advances to block 728. Otherwise, if the quiet length does not satisfy the quiet length threshold ($TH_Q$), program control advances to block 734 (FIG. 7A). At block 728, the example reverberation analyzer 212 increments a sample duration range counter corresponding to the sample duration range that the value of the sample duration counter falls within. For example, if the value of the duration range counter is 1842, the example reverberation analyzer 212 increments the sample duration range counter corresponding to 1800-2000 samples. At block 730, the example reverberation analyzer 212 set the loudness flag 308 to the quiet-indicator value. At block 732, the reverberation analyzer 212 resets the quiet threshold (e.g., to zero), the quiet length (e.g., to zero), and the sample duration counter (e.g., to zero). Program control advances to block 734 (FIG. 7A).

At block 734 (FIG. 7A), the example reverberation analyzer 212 determines whether there is another sample in the audio block. If there is another sample, program control returns to block 704. Otherwise, if there is not another sample in the audio block, example program 604 ends.

Figure 8:
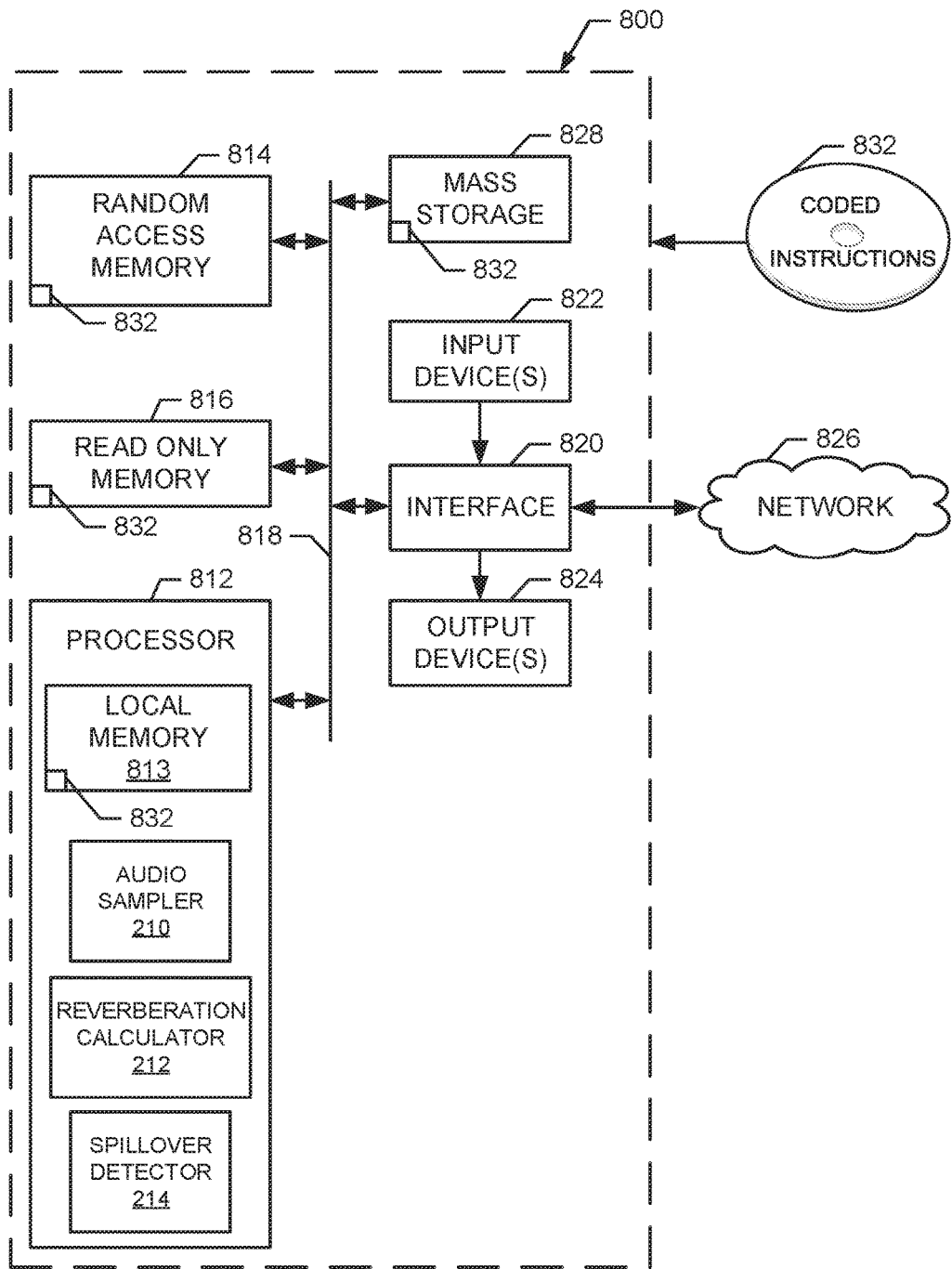
FIG. 8 is a block diagram of an example processor system structured to execute the example machine readable instructions represented by FIGS. 5, 6, and/or 7A, 7B, to implement the example spillover manager of FIGS. 1 and 2 and/or the example meters of FIGS. 1 and 2.

FIG. 8 is a block diagram of an example processor platform 800 structured to execute the instructions of FIGS. 5, 6, and/or 7A, 7B to implement the example meter 200 of FIG. 2 and/or the example spillover manager of FIGS. 1 and 2. The processor platform 800 can be, for example, a server, a personal computer, a mobile device (e.g., a cell phone, a smart phone, a tablet such as an iPad™), a personal digital assistant (PDA), a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 includes an example audio sampler 210, an example reverberation analyzer 212, and an example spillover detector 214.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 of FIGS. 5, 6, and/or 7A, 7B may be stored in the mass storage device 828, in the volatile memory 814, in the non-volatile memory 816, and/or on a removable tangible computer readable storage medium such as a CD or DVD.

From the foregoing, it will appreciate that examples have been disclosed which allow a meter 200 (FIG. 2) to detect spillover in an audio signal of a media presentation while conserving processor resources. As a result, a spillover manager 107 (FIGS. 1 and 2) may located on the meter 200. Thus, the meter 200 makes the determination of whether spillover occurred instead of requiring another device in the panelist home (e.g., the home processing system 114 of FIG. 1). Because the spillover manager 107 is located on the meter 200, the audio signal does not need to be saved and sent to the home processing system 114. Thus, the examples that have been disclosed that conserve bandwidth.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a reverberation analyzer to:
        identify a quantity of short durations of loudness in an audio signal of media presented by a media presentation device;
        calculate a ratio of the quantity of the short durations of loudness to a quantity of durations of loudness in the audio signal of the media, the quantity of the durations of loudness including the quantity of short durations of loudness;
    a processor; and
    a memory in circuit with the processor, the memory including instructions that, when executed by the processor, cause the processor to:
        store data denoting the media as un-usable to credit a media exposure based on the audio signal being spillover when the ratio does not satisfy a loudness ratio threshold.

2. The apparatus as defined in claim 1, wherein the short durations of loudness are identified based on a duration threshold.

3. The apparatus as defined in claim 1, wherein the reverberation analyzer is further to:
    determine the durations of loudness in the audio signal of the media by identifying a first transition when a loudness flag transitions from a quiet-indicator value to a loud-indicator value, and identifying a second transition in the audio signal of the media when the loudness flag transitions from the loud-indicator value to the quiet-indicator value; and
    determine a duration of one of the durations of loudness as a number of samples of the audio signal between the first transition and the second transition.

4. The apparatus as defined in claim 3, wherein the loudness flag is set to the quiet-indicator value when a sample of the audio signal satisfies a quiet threshold and a quiet length satisfies a quiet length threshold.

5. The apparatus as defined in claim 4, wherein the reverberation analyzer is further to:
    increment the quiet length when the sample of the audio signal satisfies the quiet threshold; and
    set the quiet length to zero when the sample of the audio signal does not satisfy the quiet threshold.

6. The apparatus as defined in claim 3, wherein the loudness flag is set to the loud-indicator value when a difference between a current sample of the audio signal and a previous sample of the audio signal satisfies a loud threshold.

7. The apparatus as defined in claim 3, wherein a sample duration range is incremented at the second transition, the sample duration range corresponding to the number of samples of the audio signal between the first transition and the second transition.

8. An apparatus comprising:
    means for identifying a quantity of short durations of loudness in an audio signal of media presented by a media presentation device;
    means for calculating a ratio of the quantity of the short durations of loudness to a quantity of durations of loudness in the audio signal of the media, the quantity of the durations of loudness including the quantity of short durations of loudness; and means for detecting the audio signal as being spillover, the means for detecting the audio signal as being spillover to store data denoting the media as un-usable to credit a media exposure when the ratio does not satisfy a loudness ratio threshold, the storing of the data to improve an accuracy of the media exposure credit by excluding media having indications of spillover.

9. The apparatus as defined in claim 8, wherein the short durations of loudness are identified based on a duration threshold.

10. The apparatus as defined in claim 8, further including:
means for determining the durations of loudness in the audio signal of the media by identifying a first transition when a loudness flag transitions from a quiet-indicator value to a loud-indicator value, and identifying a second transition in the audio signal of the media when the loudness flag transitions from the loud-indicator value to the quiet-indicator value; and
means for determining a duration of one of the durations of loudness as a number of samples of the audio signal between the first transition and the second transition.

11. The apparatus as defined in claim 10, wherein the loudness flag is set to the quiet-indicator value when a sample of the audio signal satisfies a quiet threshold and a quiet length satisfies a quiet length threshold.

12. The apparatus as defined in claim 11, further including:
means for incrementing the quiet length when the sample of the audio signal satisfies the quiet threshold; and
means for setting the quiet length to zero when the sample of the audio signal does not satisfy the quiet threshold.

13. The apparatus as defined in claim 10, wherein the loudness flag is set to the loud-indicator value when a difference between a current sample of the audio signal and a previous sample of the audio signal satisfies a loud threshold, the loud threshold being based on a most recent dip value of the audio signal.

14. The apparatus as defined in claim 10, wherein a sample duration range is incremented at the second transition, the sample duration range corresponding to the number of samples of the audio signal between the first transition and the second transition.

15. A non-transitory computer readable storage medium comprising instructions that, when executed, cause a machine to at least:
determine a quantity of short durations of loudness in an audio signal of media presented by a media presentation device;
determine a ratio of the quantity of the short durations of loudness to a quantity of durations of loudness in the audio signal of the media, the quantity of the durations of loudness including the quantity of short durations of loudness; and
store data denoting the media as un-usable to credit a media exposure based on the audio signal being spillover when the ratio does not satisfy a loudness ratio threshold, the storing of the data to improve an accuracy of the media exposure credit by excluding media having indications of spillover.

16. The non-transitory computer readable storage medium as defined in claim 15, wherein the short durations of loudness are identified based on a duration threshold.

17. The non-transitory computer readable storage medium as defined in claim 15, wherein the instructions are further to cause the machine to:
determine the durations of loudness in the audio signal of the media by identifying a first transition when a loudness flag transitions from a quiet-indicator value to a loud-indicator value, and identifying a second transition in the audio signal of the media when the loudness flag transitions from the loud-indicator value to the quiet-indicator value; and
determine a duration of one of the durations of loudness as a number of samples of the audio signal between the first transition and the second transition.

18. The non-transitory computer readable storage medium as defined in claim 17, wherein the loudness flag is set to the quiet-indicator value when a sample of the audio signal satisfies a quiet threshold and a quiet length satisfies a quiet length threshold.

19. The non-transitory computer readable storage medium as defined in claim 18, wherein the instructions are further to cause the machine to:
increment the quiet length when the sample of the audio signal satisfies the quiet threshold; and
set the quiet length to zero when the sample of the audio signal does not satisfy the quiet threshold.

20. The non-transitory computer readable storage medium as defined in claim 17, wherein the loudness flag is set to the loud-indicator value when a difference between a current sample of the audio signal and a previous sample of the audio signal satisfies a loud threshold, the loud threshold being based on a most recent dip value of the audio signal.

\* \* \* \* \*